US012417668B2

(12) United States Patent
Jakobs et al.

(10) Patent No.: US 12,417,668 B2
(45) Date of Patent: Sep. 16, 2025

(54) CONTROLLING A SYSTEM FOR HANDLING VALUABLE OBJECTS AND PREPARING/OUTPUTTING PACKS OF VALUABLE OBJECTS

(71) Applicant: GIESECKE+DEVRIENT CURRENCY TECHNOLOGY GMBH, Munich (DE)

(72) Inventors: Andreas Jakobs, Munich (DE); Michael Knickrehm, Augsburg (DE); Wolfgang Koniger, Karlsfeld (DE); Ralf Linck, Munich (DE); Jurgen Von Kremling, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 191 days.

(21) Appl. No.: 17/776,507

(22) PCT Filed: Nov. 11, 2020

(86) PCT No.: PCT/EP2020/025506

§ 371 (c)(1),
(2) Date: May 12, 2022

(87) PCT Pub. No.: WO2021/093992

PCT Pub. Date: May 20, 2021

(65) Prior Publication Data

US 2022/0383689 A1 Dec. 1, 2022

(30) Foreign Application Priority Data

Nov. 13, 2019 (DE) ..................... 10 2019 007 878.0

(51) Int. Cl.
*G07D 11/30* (2019.01)
*G07D 11/18* (2019.01)
(Continued)

(52) U.S. Cl.
CPC ............. *G07D 11/30* (2019.01); *G07D 11/18* (2019.01); *G07D 11/40* (2019.01); *G07D 11/50* (2019.01)

(58) Field of Classification Search
CPC ........ G07D 11/30; G07D 11/18; G07D 11/40; G07D 11/50; G07D 11/20
See application file for complete search history.

(56) References Cited

U.S. PATENT DOCUMENTS 7,131,593 B2 11/2006 Steinkogler et al.
7,487,909 B2 2/2009 Eberhardt et al.
(Continued)

FOREIGN PATENT DOCUMENTS

CN 104809803 A 7/2015
DE 10046082 A1 4/2002
(Continued)

OTHER PUBLICATIONS

International Search Report from PCT Application No. PCT/EP2020/025506, Feb. 19, 2021.
(Continued)

*Primary Examiner* — Sonji N Johnson
(74) *Attorney, Agent, or Firm* — Workman Nydegger

(57) ABSTRACT

A method is provided for controlling a system or a device for recognizing, checking, counting, accounting and sorting objects of value, which can be automatically adapted to changing delivery and demand conditions. A control controls the transport paths and processing steps within the device with the aid of conveyor plants and corresponding diverters and optimizes them in such a way that the objects of value are transported in a targeted fashion to the processing stages which are necessary for the processing of the objects of value. The control takes into account information about the components of the device as well as the inbound-
(Continued)

delivered objects of value and the objects of value to be delivered outbound in order to ensure optimal processing of the objects of value or to deliver ordered packs of objects of value outbound as quickly as possible.

25 Claims, 12 Drawing Sheets

(51) Int. Cl.

| | |
|---|---|
| ***G07D 11/40*** | (2019.01) |
| ***G07D 11/50*** | (2019.01) |

(56) References Cited

U.S. PATENT DOCUMENTS

| | | | | |
|---|---|---|---|---|
| 7,997,418 | B2 | 8/2011 | Loffler et al. | |
| 8,588,961 | B2 | 11/2013 | Goltz | |
| 8,887,995 | B2 | 11/2014 | Seibert | |
| 9,141,876 | B1 * | 9/2015 | Jones | G07D 11/30 |
| 2004/0050649 | A1 | 3/2004 | Loffler et al. | |
| 2004/0211829 | A1 | 10/2004 | Steinkogler et al. | |
| 2005/0060055 | A1 * | 3/2005 | Hallowell | G07D 11/50 700/95 |
| 2006/0212372 | A1 * | 9/2006 | Eberhard | G06Q 20/042 705/35 |
| 2007/0187485 | A1 | 8/2007 | Aas et al. | |
| 2012/0191239 | A1 | 7/2012 | Goltz | |
| 2012/0276881 | A1 | 11/2012 | Seibert | |
| 2018/0005481 | A1 | 1/2018 | Nakanishi | |

FOREIGN PATENT DOCUMENTS

| | | | | |
|---|---|---|---|---|
| DE | 10049435 | A1 | 4/2002 | |
| DE | 10329321 | A1 | 1/2005 | |
| DE | 102004006532 | A1 | 9/2005 | |
| DE | 102007014176 | A1 | 8/2008 | |
| DE | 102009043093 | A1 | 3/2011 | |
| DE | 102011000294 | A1 | 7/2012 | |
| EP | 2953100 | A1 * | 12/2015 | G07D 11/0057 |
| JP | S59139491 | A | 8/1984 | |
| JP | 2015207228 | A | 11/2015 | |
| RU | 2697620 | C2 | 8/2019 | |
| WO | WO-2019077792 | A1 * | 4/2019 | G07D 3/00 |

OTHER PUBLICATIONS

Search Report from German Application No. 102019007878.0, Apr. 16, 2020.

* cited by examiner

CONTROLLING A SYSTEM FOR HANDLING VALUABLE OBJECTS AND PREPARING/OUTPUTTING PACKS OF VALUABLE OBJECTS

BACKGROUND

The invention relates to a method for controlling a system for processing, in particular for recognizing, checking, counting, where applicable accounting and sorting, objects of value and for assembling and/or outputting packs of objects of value.

The person skilled in the art is familiar with the now very efficient specialized machines for capturing, scanning, checking, counting and sorting of objects of value, for example bank notes, of which approx. 10 to 40 pieces can be processed without error in one second. Objects of value can not only be recognized and checked by these machines, but also sorted according to distinguishing features, counted and packed into a set number of pieces. Bank notes can e.g. be sorted according to their nominal value, sorted out corresponding to their conditions or—if acceptable—brought together into packs of one hundred or one thousand bank notes and tied together and marked with an appropriate band. In this way, packs of objects of value can be produced whose additional value lies in the trustworthiness of the information about the quality and quantity of the objects of value contained therein.

However, the machines are only designed for the aforementioned tasks, so that for processing the objects of value further manual steps are often necessary. In many cases, the objects of value are filled into feeding containers in an additional processing step. Here, the size of the feeding containers is adapted to the machines or the system, but not to the volume of the deliveries of objects of value. Individual partial deliveries must therefore be separated by header cards which carry information about the depositor of the objects of value and thus allow a clear allocation of the objects of value. Also the objects of value or packs of objects of value that have already been processed by the machines are again loaded into transport bins for stocking, further processing, assembling or outbound delivery in additional manual processing steps.

Likewise, large plant systems are known, e.g. cash centers for processing bank notes, in which several specialized machines of the type described operate to process in parallel and/or successively several packs of objects of value which may be unsorted and unchecked or at least not trustworthy. Such large systems have highly secure stocking and storage devices and areas with an even higher level of security, such as e.g. vaults. They are equipped with e.g. a high-bay stocking facilities and are usually managed with the aid of transport vehicles with a lifting function. As the objects of value pass through the cash center, they are usually brought several times into an area with the highest level of security, e.g. to securely bridge waiting time after the inbound delivery or before sorting or before assembling. The areas of highest security are often only accessible via security locks, so that the processing of the objects of value on their way through the region of highest security involves considerable additional effort. The preparation and assembling of the objects of value, however, takes place in areas of lower security.

The preparation of delivered objects of value for processing by the specialized machines is carried out manually according to the prior art by opening the containers or bags in which the objects of value are delivered, grouping the objects of value into mostly loose, still unformatted packs, fitting the packs or loose bundles into feeding containers and transporting the feeding containers to the specialized processing machines. After checking, counting and sorting, the way continues from the processing machines to the vault area and later, when called up for assembling, from the vault area to the place of assembling. There, the processed and sorted objects of value, such as bank notes or coins, are counted off in the exact quantity requested, the desired quantity of objects of value (of a certain nominal value or in each case the desired quantity of objects of value of different nominal values) is compiled and filled into outbound delivery containers. These partly automatic, partly semi-automatic and partly manual processing steps lead to considerable personnel expense and also to risks in terms of security, reliability and trustworthiness of the processes.

All these systems also have the disadvantage that they cannot be sufficiently adapted to the changing inbound-delivery and outbound-delivery conditions that may occur, for example, as a result of high cash turnover at public festivals or during the Christmas season. Consequently, the available systems run at times at maximum load with threatening congestion and disruptive blockages, or idle and with very low efficiency. In addition, the need for personnel fluctuates greatly over time.

SUMMARY

It is the object of the invention to make the operation of a system for recognizing, checking, counting and sorting objects of value and assembling or outputting packs of objects of value more adaptable and at the same time more efficient.

The use of the singular shall not exclude the plural, which shall also apply in the reverse sense, unless otherwise disclosed.

Hereinafter, individual method steps will be described in more detail. The steps do not necessarily have to be carried out in the order given, and the method to be described may also have further steps not mentioned.

For achieving the object, a method is proposed for controlling a system for recognizing, checking, counting, where applicable accounting and sorting objects of value and for assembling packs of objects of value. The system has at least one preparation stage and equipment for recognizing, checking, counting, sorting and, where applicable accounting objects of value and for assembling packs of the objects of value. The equipment is configured as a mechatronic system, for example. The equipment has at least one entry stage as well as a first processing area with one or more processing stages in which the objects of value are processed, in particular recognized and/or checked and/or counted and/or sorted. The equipment further has at least one second processing area with one or more output stages in which the objects of value are processed, in particular assembled and/or outputted from the apparatus.

Upon assembling, a certain quantity of objects of value of a certain nominal value or, in each case, the desired quantity of objects of value of different denominations is compiled. For the outbound delivery to a customer, the compiled objects of value are packed together, where applicable. The respective compilation corresponds to the order of a customer (e.g. of the cash center) who requests the respective compilation, whereby the respective desired compilation may vary from order to order or from customer to customer.

The first step of the method is to receive objects of value or packs of objects of value in a preparation stage which is arranged to prepare the objects of value for the further processing steps. Subsequently, the objects of value are then forwarded to an entry stage of an equipment for recognizing, checking, counting, accounting and sorting of objects of value. The objects of value are then recognized and/or checked and/or counted and/or sorted in a first processing area in at least one processing stage in the equipment. In a second processing area, the objects of value are sorted again and/or assembled into packs, where applicable, in at least one output stage.

The objects of value are checked in the preparation stage e.g. for advance information about the objects of value, which can be utilized for optimizing the transport paths, processing times and processing costs through the entry, processing and output stages, or the system and the trustworthiness of the packs of objects of value in the output. This includes information about the packaging of the objects of value, the composition and/or denomination of each delivery, the origin (e.g. the depositor) of the objects of value and/or their quality. With the aid of this advance information it is decided, in which way and with which combination of entry, processing and output stages the objects of value are best processed. For example, bank notes delivered inbound in cash cassettes from ATMs no longer have to be checked for authenticity in certain cases. Deliveries of objects of value in security bags, also called safe bags, however, require more effort, as the objects of value may have to be pre-grouped and checked for damage, wear or authenticity.

Furthermore, the proposed method is able to react flexibly to a demand for objects of value to be delivered that is predictable e.g. by data analysis or that arises suddenly. If, for example, many bank notes with a small nominal value of e.g. 5 EUR are currently required and it is known in advance that many 5 EUR bank notes are usually delivered by a certain depositor of objects of value, the system can be controlled with the aid of this advance information in targeted fashion such that the inbound-delivered objects of value that include or are at least likely to include the bank notes or objects of value of the required nominal value are selectively brought to the entry stages, processing stages and output stages. Among other things, this offers the possibility to react in targeted fashion and as quickly as possible to special requests or bank note orders.

In the system, there is present advance information about the objects of value that are received at the preparation stage. These are processed by the control of the system and can be received from outside the system. For example, the advance information arrives at the preparation stage. However, they can also be transmitted directly from outside the system to the control of the system. The advance information for optimizing the processing of the objects of value can, for example, already be available upon the inbound delivery of the objects of value or be delivered with the inbound delivery containers. Often only the inbound delivery container is uniquely marked with an identifier or identification and the advance information is completely or partially assigned to this identifier or identification. The information contains, for example, advance information about the origin of the objects of value, which can usually be taken from the corresponding delivery notes, or the denomination of the delivered packs of objects of value, about which, in the case of cash boxes from supermarkets or ATMs, information may already be present in many cases.

When the advance information comes from external sources, it is preferably complemented by a statement on its reliability. Less reliable information is either entirely ignored, utilized only for operations that cannot endanger the trustworthiness of the packs of objects of value to be delivered, and/or is checked or verified in additional processing steps. Information from reliable long-term customers, however, can be checked more quickly and more cost-effectively using less complex methods before it is used for further processing the objects of value. Details coming from the central bank can be assumed to be correct and simply taken over and utilized for the further processing of the objects of value. The processing of the objects of value can thus be effected more quickly and more cost-effectively.

In particular, advance information about deliveries can be obtained based on the documentation of previous orders. An example thereof is the expected denomination in supermarket safe bags, in which bank notes with a higher nominal value are to be expected in particular. The method thus optionally also utilizes information analytically obtained from the past, such as that made available e.g. with data analysis technologies. In these and similar cases, the system for processing the objects of value can adjust itself already in anticipatory fashion to the necessary processing steps. This can also be done at a time before the inbound delivery of the objects of value to be processed.

The documentation of previous orders may also comprise the processing times and costs incurred by the system in handling these orders. The system can thus adjust to inbound deliveries of objects of value that are regularly crumpled, soiled or poorly sorted and therefore require further and/or more elaborate processing steps, and plan the processing steps required for this. The processing of such objects of value can, for example, be postponed until later in order to place the expected disruptions in the operating procedure in a period when few inbound deliveries or requests or orders are to be expected.

However, the advance information can also be obtained upon inbound delivery by observing and/or measuring the properties of the objects of value. Even though the capturing methods used for this are often not suitable for providing sufficiently defined and trustworthy information, they are still suitable for controlling the system and its subsystems in an optimized and adaptive way. For example, a pattern recognition system in the preparation stage can check the delivered objects of value for soiling or damage and thus avoid failures caused by soiled or damaged objects of value. In the case of transparent safe bags or after opening the delivery containers, pattern recognition methods can also be employed to roughly determine the denomination, such as by pattern recognition based on the color of the contents. It is also possible to weigh the delivered objects of value and to get a rough picture of the denomination of the objects of value with the aid of details about the total amount, which e.g. are provided by the customer. This allows further optimizations for processing the objects of value.

When the system according to the invention is operating, it is preferred to handle orders as quickly and absolutely reliably as possible. For this purpose, request information about the objects of value to be delivered outbound by the system, e.g. about the packs of objects of value ordered from a cash center, can be combined with the advance information present in the system and evaluated together. If, for example, the composition of the inbound-delivered packs of objects of value is already known and their contents match an order, the processing of these packs by the system can be prioritized in order to be able to quickly handle a request for outbound delivery of certain denominations of objects of value and packs of objects of value. If, for example, a supermarket has ordered many coins and/or bank notes with a small nominal value, the inbound deliveries of objects of value that contain a significant share of coins and/or bank notes with a small nominal value are processed first. Similarly, inbound deliveries of objects of value originating from a jeweler and accordingly containing bank notes with higher denomination can be preferred and processed with a higher priority if it is precisely bank notes with a higher denomination that are needed for assembling packs to be delivered outbound. If, in another example, partially filled ATM cassettes have been delivered coming from ATMs or, in another example, partially filled special storage containers for bank notes, such as Nota Tracc Trays, have been delivered inbound coming from a bank, in which the quality, denomination and authenticity of their contents are known, an authenticity check can be omitted and they only need to be counted to establish trustworthiness. In this case, the system is controlled in such a way that the count can be effected particularly quickly and efficiently. In this way, orders can not only be processed more quickly, but stocking costs for processed but not yet outbound-delivered objects of value can also be avoided.

The above-mentioned request information about packs to be delivered outbound or ordered packs contains, in particular, details regarding their orderer, the quantity, the packaging, the composition and/or denomination of the contents, the destination, the intended use and/or the quality or condition of the objects of value. The request information may include, in particular, that only a certain selection of the inbound-delivered objects of value may be used for the completion of the requested trustworthy packs. Then the system is controlled such that only the admissible objects of value are fed to the processing of this order or request. This is crucial e.g. for banks that only need to have a pack of bank notes counted or checked for authenticity and should receive the same bank notes back again. Taking all or parts of this information into account guarantees comprehensive optimization of the necessary processing steps and a reliable and secure operation of a system for recognizing, checking, counting, accounting and sorting objects of value and for assembling packs of objects of value.

In order to be able to better plan the utilization of the system or necessary maintenance cycles of machines, it is advantageous to additionally make use of external information, i.e. information that is not linked to the objects of value at first glance. This is, for example, information about special events such as public festivals, fairs or Christmas markets, which can lead to high and very special demands on a system for recognizing, checking, counting, accounting and sorting objects of value and for assembling packs of objects of value. Maintenance cycles, the replacement or installation of new machines can thus be placed in periods that are expected to have a low utilization of the system. Vice versa, additional or special machines can be requested when high loads or special requests are announced.

When optimizing the system, not only information about the objects of value but also performance information such as processing times and costs for recognizing, checking, counting, accounting, sorting and/or assembling play a major role. For example, the processing of bank notes taken from an ATM cassette or Nota Tracc Tray can be effected at a significantly higher speed than that of bank notes that may have been delivered in a safe bag in a crumpled or torn condition. The performance information can also be collected and documented on a customer-specific basis and used e.g. to plan the processing of that customer's next pack of objects of value.

Processing times and costs depend not only on the quality of the objects of value, the type of processing or the possible processing speeds, but also on the performance parameters of individual machines. Older machines usually show wear that can lead to failures under high loads. Likewise, the machinery in a system is often nonuniform or has machines with different technologies and performance parameters. Machine-specific performance parameters can be considered in order to optimize the transport paths through the system.

Preferably, the system according to the invention has one or more temporary storages, which are designed, e.g., as deposit surfaces, storage or stocking places for the objects of value or partially finished packs of objects of value, and which may be part of a transport system. These temporary storages and/or the components of the transport system that have an inherent storage function can be utilized in the optimization of transport paths and processing steps in order to counteract jams and overproduction without having to outbound-deliver the objects of value or stock them in an area with a higher security level. They can also take up and temporarily store objects of value that, due to their condition or origin, are expected to cause disruptions and downtimes or require more elaborate processing steps. They also facilitate the assembling of packs, as the at least one output stage can access these temporary storages and thus a larger selection of objects of value or packs of objects of value.

For example, a temporary storage may be reachable from the area between the preparation stage and the entry stage to take up objects of value or untrustworthy packs of objects of value that have been inbound-delivered but could not have been processed yet. This represents an advantage in making the processing processes more flexible. These temporarily stored packs coming from the preparation stage are normally not trustworthy because even if they originate e.g. from incoming partially filled ATM cassettes and thus have only one defined denomination, according to the prior art their number is not yet sufficiently defined and thus not trustworthy.

A temporary storage may alternatively or complementary be disposed between the at least one entry stage and the at least one processing stage. These temporary storages contain, on the one hand, untrustworthy packs of objects of value before they are brought to a processing stage and, on the other hand, also trustworthy packs as semifinished packs on their way to the assembling or to the at least one output stage. The identification of the contents of the packs is effected unambiguously and highly securely via a digital capture system that is part of the control.

The system may also comprise a temporary storage positioned between the at least one processing stage and the assembling or at least one output stage. This temporary storage supports the assembling of packs, as the machines for assembling or the at least one output stage can access this temporary storage and thus a larger selection of objects of value or packs of objects of value.

In a preferred embodiment, at least one of the temporary storages is designed with a higher security level than the entry, processing and output stages. Such secure temporary storages can be utilized, for example in the event of failures, for the secure and quick stocking of the objects of value, possibly even for longer periods of time and/or for protecting the objects of value from theft or destructive influences such as fire. For maintenance and repair work on the system, the objects of value can be brought to a highly secure area so that subsequently maintenance personnel can do their work. Alternatively, the system has connections to the secure main stocking facility or vault, and the transport systems, temporary storages, entry, processing and output stages are controlled such that all objects of value located therein are transported to the storage of highest security when required.

The system for recognizing, checking, counting, accounting and/or sorting objects of value or assembling packs of objects of value may comprise configurable machines and apparatuses as well as configurable elements therein, the functions of which are activated and/or rearranged as required. This is effected, for example, by variably switching or activating or deactivating certain processing stages and usually requires forward-looking planning. The latter is made possible in many cases by the described procedure in the first place and can be utilized to increase the efficiency of the system. In the technology according to the invention, this configuration of the apparatuses in the area of the entry stages and/or the processing stages and/or the assembling or the at least one output stage is effected using the preparation information and/or further information such as e.g. request information and/or performance information.

The adaptability, efficiency and/or variability of the system can be further increased when at least one entry stage is utilized for outputting packs of objects of value and/or as a output stage. In this case, the at least one entry stage is equipped with the means necessary for outputting packs of objects of value, for example a pick-and-place robot. It may further have means for sorting the objects of value and assembling packs of objects of value.

In the preparation stage, the delivered objects of value are positioned in a receiving means in which they can be fed to further processing in the entry stage. These processing steps can also be included in a comprehensive optimization of the processing of the objects of value and of the packs of objects of value by the system.

The objects of value are e.g. bank notes and/or coins.

BRIEF DESCRIPTION OF THE DRAWINGS

Further details and features result from the following description of preferred embodiment examples in connection with the Figures. The respective features can be realized in isolation or several features can be realized in combination with each other. The possibilities of achieving the object are not limited to the embodiment examples. The embodiment examples are represented schematically in the Figures. Identical reference numbers in the individual Figures indicate identical or functionally identical elements or elements that correspond to each other in terms of their functions. In detail, the Figures show.

DETAILED DESCRIPTION OF VARIOUS EMBODIMENTS

Figure 1:
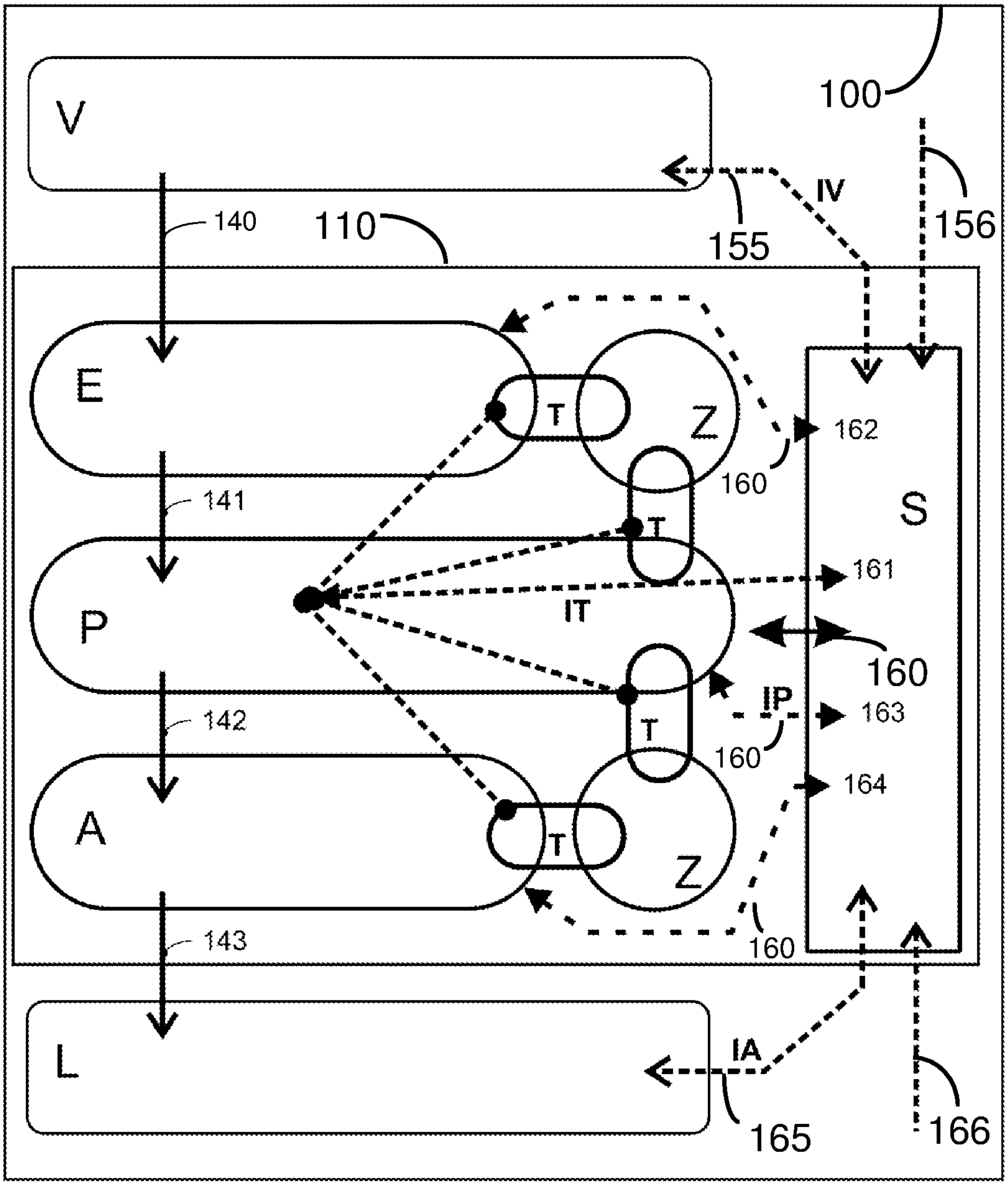
FIG. 1 a system for recognizing, checking, counting, accounting and sorting objects of value and assembling packs of objects of value.

FIG. 1 shows a system 100 for producing trustworthy packs of objects of value comprising a preparation stage V, a modular processing equipment 110 with an input area E with conveyor plants 140 for inputting objects of value from the preparation stage V and conveyor plants 141 for forwarding objects of value to a first processing area P with processing stages (hereinafter referred to as $P_n$; n is utilized hereinafter as a counting variable for natural numbers, where n can assume the values 1, 2, 3, . . . ) with processing modules (hereinafter referred to as $P_{nm}$; m is likewise utilized hereinafter as a counting variable for natural numbers, where n can assume the values 1, 2, 3, . . . ) e.g. for recognizing, checking, counting, accounting and sorting objects of value, in which trustworthy packs of objects of value are produced. Then the objects of value are forwarded with the aid of conveyor plants 142 for assembling trustworthy packs of objects of value in a second processing or output area A, and the outbound delivery with the aid of conveyor plants 143 to a delivery stage L of the system from which the assembled packs of objects of value are delivered outbound. Moreover, the system further comprises a control S that receives advance information IV via an information channel 155 and likewise receives request information IA via an information channel 165 and utilizes these information items to generate control information 161, 162, 163 and 164 for the system 100 and transmit these to the system via at least one information channel 160. For example, the control information serves for the system to select a certain transport path through the system for certain objects of value or to select certain processing stages for processing those certain objects of value. The control information can activate mechatronic devices that are currently and adaptively best suited for the processing. Moreover, the control S can make use of temporary storages Z and corresponding conveyor plants T to the temporary storages Z in order to further optimize the processing of the objects of value. For this, further information 166 on expected orders and information 156 on expected inbound deliveries are used. Via the information channel 160, performance information IP about the stages and modules of the processing area P and information IT about the conveyor plants 140, 141, 142, 143 and T are also used for optimizing the processing of the objects of value by the system 100.

The control S performs the adapted activation, combination and configuration of the numerous stages and modules of the system 100, in particular of the subsystems E, P, A and Z and the conveyor plants 140, 141, 142, 143 and T. This often makes it possible to process several orders in parallel or in quick succession. For this purpose, the control S exchanges information IV with the preparation stage V and information IA with the delivery stage L. It sends commands 161, 162, 163, 164 for controlling the system 100 and the processing device 110 with its subsystems E, P, A, T, Z, etc.

Very often, the objects of value processed in the system 100 are bank notes or coins. The machines or processing stages $P_n$ of the processing area are often individual, different modules $P_{nm}$ for executing different measurements or tests on e.g. the bank notes. Typical functions of these modules are:

- recognizing the nominal value of the bank notes and of the national origin, e.g. by means of image recognition;
- authenticity checking, whereby there may be individual machines $P_n$ or modules $P_{nm}$ for different security features, unless several security features can be checked in one step;
- checking the condition or quality of the bank notes or objects of value in general. These can be physically affected by repeated circulation in the course of business, which is why they may be earmarked for replacement;
- counting.

After passing all these tests, the objects of value are sorted, validated or qualified and quantified, i.e. counted and evaluated. They are then typically classified in a higher security level. Preferably, the processing area P delivers trustworthy packs of qualified, sorted and accurately counted bank notes, which can then be further used within the framework of assembling.

Figure 2:
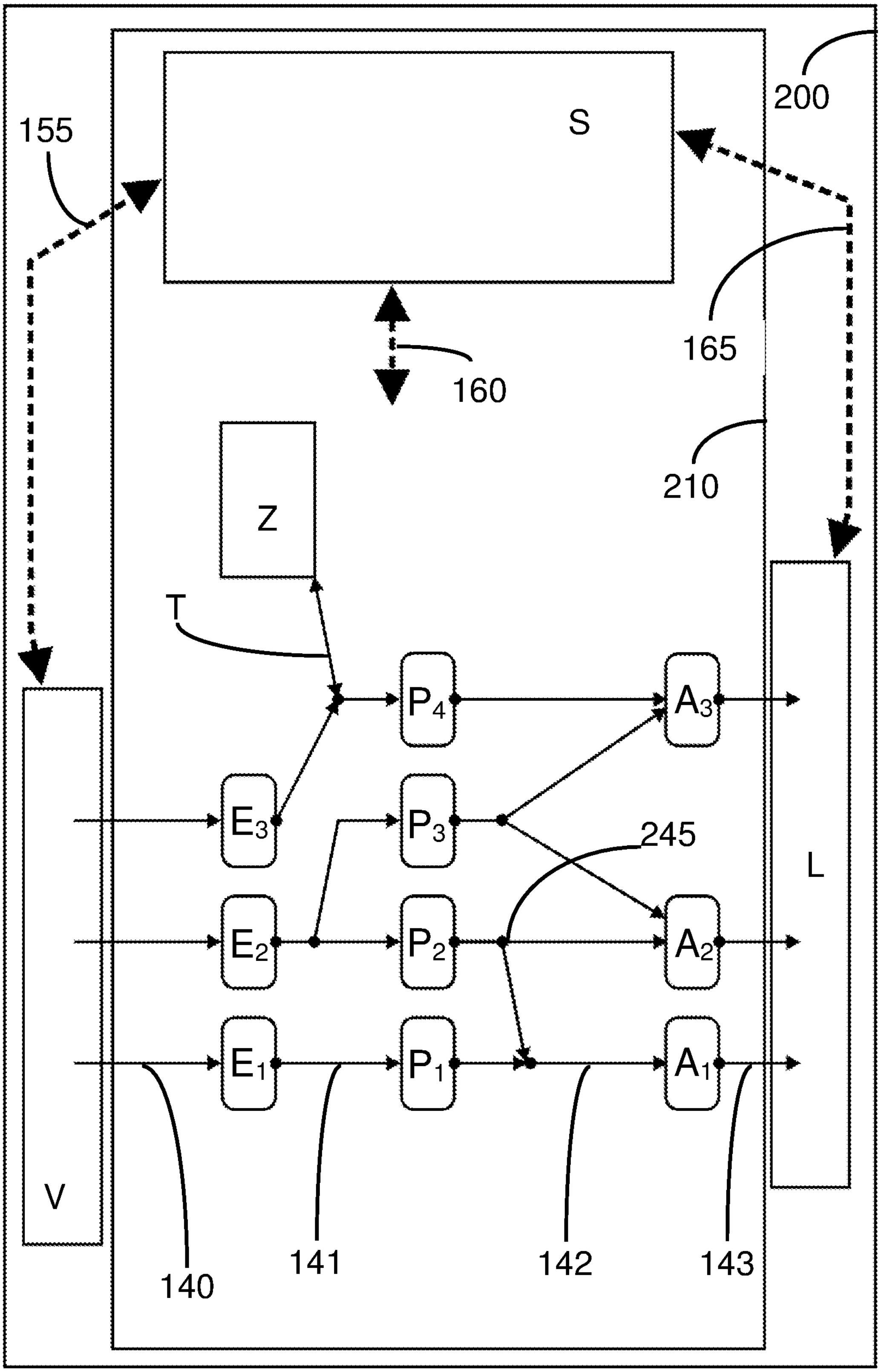
FIG. 2 a system for recognizing, checking, counting, accounting and sorting objects of value and assembling packs of objects of value with a plurality of entry, processing and output stages.

FIG. 2 shows a system 200 for recognizing, checking, counting, accounting and sorting objects of value and assembling objects of value, comprising a preparation stage V, equipment 210 for recognizing, checking, counting, accounting and sorting objects of value and assembling packs of objects of value, a post-processing stage L and a control S. The equipment 210 represents modular processing equipment or a mechatronic system. It comprises entry stages $E_n$ of an entry area E, machines or processing stages $P_n$ of a processing area P for recognizing, checking, counting, accounting and sorting objects of value, and machines $A_n$ of an output area A for assembling trustworthy packs of objects of value, which can be considered as exit or output stages of the mechatronic system 210. The transport of the objects of value first takes place from the preparation stage V to the entry stages $E_n$ of the mechatronic system 210 via conveyor plants 140. Within the mechatronic system 210, the transport is effected with the aid of conveyor plants 141, 142 and T, which are either directly connected to the components of the mechatronic system 210 or are connected to other conveyor plants 141, 142, T and/or the machines $P_n$ and/or $A_n$ via diverters 245 (or other connection modules). Assembled packs of objects of value are brought to the post-processing stage L via further conveyor plants 143. In addition, the system 200 has a temporary storage Z.

The control S exchanges information or commands for controlling the system 200 with the preparation stage V via the information channel 155, with the mechatronic system 210 via the information channel 160 and with the post-processing stage L via the information channel 165.

The processing of the objects of value may be effected fully automatically within the mechatronic system 210 and with the aid of the conveyor plants 140, 141, 142, 143 and T or the control S. The processing can moreover be optimized with regard to processing times and processing costs. This is achieved, on the one hand, by the conveyor plants 140, 141, 142, 143 and T and the diverters 245, with which the processing of the objects of value can be distributed to or concentrated on several machines $P_n$. On the other hand, machines $P_n$ can be omitted or interconnected in such a way that only the machines $P_n$ necessary for processing are passed through by the objects of value. Additionally, the temporary storage Z may be utilized to counteract jams or overproduction, or to remove the objects of value not necessary for the outbound delivery of packs of objects of value from the active components of the mechatronic system 210. Furthermore, inbound deliveries of objects of value originating from a jeweler and accordingly containing bank notes with higher denomination can be preferred and processed with a higher priority if it is precisely bank notes with a higher denomination that are needed for assembling packs to be delivered outbound.

The optimization of the processing of the objects of value can be effected particularly effective in the system 200, since preferably all information that is available about the individual components of the system 200 and the objects of value that are located therein, delivered inbound and requested is collected and utilized. Objects of value that have already been pre-sorted and pre-qualified in the preparation stage V can, for example, be loaded into special entry stages $E_n$ that allow direct access to the specialized machines $P_n$, e.g. for particularly quick processing. This of course also applies to systems 200 that are less automated, i.e. in particular to systems 200 in which the conveyor plants 140, 141, 142, 143 and/or T are simple transport paths.

In this way, the system 200 allows the objects of value of different depositors to be processed spatially separated from each other. If, for example, bank notes from a first bank are delivered, they can be forwarded to the entry stages $E_1$ and processed by the downstream processing stage $P_1$. At the same time, bank notes from a second bank can be forwarded to the entry stage $E_2$ and processed by the processing stage $P_2$. In this way, bank notes from different financial institutions can be processed at the same time, while the separation of the bank notes according to their depositors is guaranteed at all times.

The entry stages $E_n$ can be designed differently. They can have locks, gates, doors or flaps. In addition, they may have chutes, drop lanes or conveyor belts for the objects of value so that they can be securely forwarded from the preparation stage V to the processing area.

The same applies to the output stages $A_n$. They can be constructed in a similar way to the entry stages, but have additional filling and/or stacking devices to load outbound delivery containers such as safe bags, ATM cassettes, Nota Tracc Trays or pallets with individual banded packs of objects of value.

Figure 3:
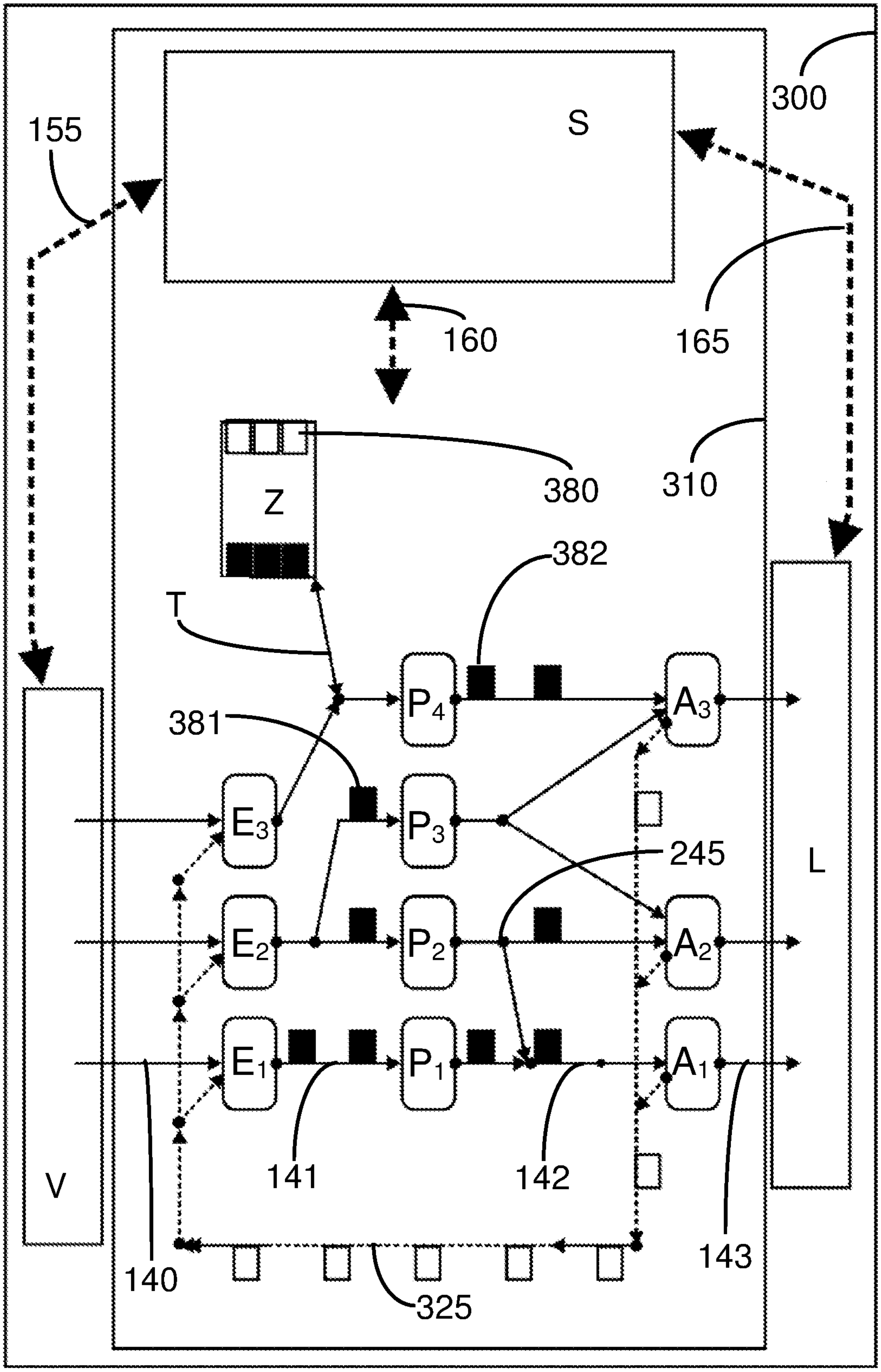
FIG. 3 a system for recognizing, checking, counting, accounting and sorting objects of value and assembling packs of objects of value with a storage transport system.

FIG. 3 shows a system 300 for recognizing, checking, counting, accounting and sorting objects of value and assembling packs of objects of value, in which the transport of the objects of value is effected within a mechatronic system 310 with the aid of a storage transport system and transport containers or small transport containers 380, 381 and 382. The storage transport system comprises a plurality of conveyor plants 141, 142, T and 325. Here, the conveyors 325 return transport containers or small transport containers 380 that are empty from the machines $A_n$ of the output area A to the entry area E. The conveyors 141 and T move transport containers and small transport containers 381, which contain untrustworthy packs of objects of value. In contrast, the conveyors 142 transport containers or small transport containers 382 that contain packs of objects of value that have been checked by the processing stages $P_n$, i.e. are trustworthy. Preferably, these are small transport containers that can hold e.g. 300 to 800 bank notes and take them up securely. In addition to simple containers, the small transport containers can also be designed in the form of clamps and/or grippers. In this case, the entry stages $E_n$ and the machines $A_n$ of the output area A differ from the previously described stages $E_n$ and $A_n$ by mechatronic devices for taking objects of value from the small transport containers or from inbound delivery containers, such as e.g. remaining cash from inbound-delivered ATM cassettes or special storage containers for bank notes, such as e.g. Nota Tracc Trays, or for filling the small transport containers 380, 381 and/or 382 with objects of value or outbound delivery containers with packs of objects of value. The same applies to the machines $P_n$ of the processing area P and the temporary storage Z. Here, diverters 245 (or other connection modules) couple the individual conveyor plants 141 and T or 142 to each other or to the machines $P_n$ and $A_n$. The system 300 likewise has a control S that, in addition to the information described previously, also collects and utilizes information about the small transport containers 380, 381 and 382 and their contents. The information necessary for this is exchanged via the channel 160 which also transmits the commands of the control S to the mechatronic system 310.

Due to the storage transport system, the mechatronic system 310 can take up a larger volume of objects of value on the one hand and process and transport them at the same time. And it can better examine the number of objects of value transported at the same time. This creates new possibilities for optimizing the processing of objects of value by the control S and existing possibilities are better utilized. Filling the small transport containers 381 by the mechatronic devices of the entry stages $E_n$, the containers 382 by the machines $P_n$ of the processing area P, or the machines $A_n$ of the output area A is effected here in a manner that ensures a further processing or stocking of the objects of value by the mechatronic system 310. Manual steps and concomitant security risks can thus be almost entirely avoided or reduced to exceptional cases.

With the aid of the information channel 160, the control S effects an adaptively controlled transport and an adaptively controlled processing of the objects of value within the mechatronic system 310. The transport is effected with the aid of the modularly activatable and combinable conveyor plants 140, 141, 142, 143, 325 and T. The processing can thus be optimized with respect to processing times, processing costs, security and trustworthiness of the processed objects of value. This is achieved, on the one hand, through an improved adaptability by setting the branches and hubs or diverters 245 in the transport paths in such a way that processing is carried out in a suitable manner on the path from E via P to A in series or in parallel as required, or the stages $E_n$, $P_n$ and $A_n$ necessary for processing are approached. If, e.g., the speed of the P-stages is only half that of the E-stages, then one E-stage delivers to two P-stages working in parallel via an alternately switchable branch or diverter 245.

In addition, the temporary storage Z may be used not only to counteract jams or overproduction or to remove from the active components of the mechatronic system 210 those objects of value not required for the outbound delivery of packs of objects of value, but also to hold available empty small transport containers 380 for a later filling, e.g. upon peaks in the inbound delivery of objects of value, or to keep small transport containers 381 and/or 382 for a later processing and/or outbound delivery.

In the illustrated system 300, the objects of value are transported with the aid of transport containers or small transport containers 380, 381 and 382. Within the processing system 310 there are in operation

- small transport containers 380 without contents,
- small transport containers 381 with unqualified, unquantified and therefore untrustworthy contents,
- small transport containers 382 with qualified, quantified and thus trustworthy contents.

The small transport containers 380 are filled with objects of value, e.g. a loosely grouped quantity of bank notes, in the entry stages $E_n$ and then form a filled or only partially filled small transport container 381 with an untrustworthy pack of objects of value. The empty transport containers 380 arrive via the transport path 325 to the input E or via the transport paths T from the temporary storage Z. The objects of value or bank notes are qualified and quantified by the processing stages $P_n$. In the processing area, qualified objects of value are brought together into trustworthy packs, with the value information being fed to the control S. The control S assigns the value information to the small transport container 382 having the trustworthy pack, e.g., on the basis of an identifier or an identification on the small transport container 382, and thus to the pack contained therein. After the processing P, trustworthy packs of objects of value are present. Preferably, these are filled into small transport containers 380, which come either via a transport path 325 from the output area A or via a transport path T from the temporary storage Z or another area (not explicitly shown). This creates trustworthy filled small transport containers 382. These are guided from P via the transport device 142 to the output area A. There, they form the source material for the production of the requested deliveries of trustworthy packs of objects of value. For this, according to the control commands, the requested objects of value are mechatronically taken from the small transport containers 382 as required.

The control S may further use the request information 165 together with the information about other small transport containers in the mechatronic system 310 in order to fill exactly the appropriate quantity and the appropriate type of objects of value into small transport containers 382 in order to appropriately extend or appropriately complete a delivery. For this purpose, a processing information system PIS (not explicitly shown) serves as part of the control S or is configured separately, which manages the entire value information from the system 300. The value information are passed via the information interface 160 or via other ways. The return transport of the emptied small transport containers 380 from A to E or also from A to P and possibly into the temporary storage Z is effected via transport devices 325.

Figure 4:
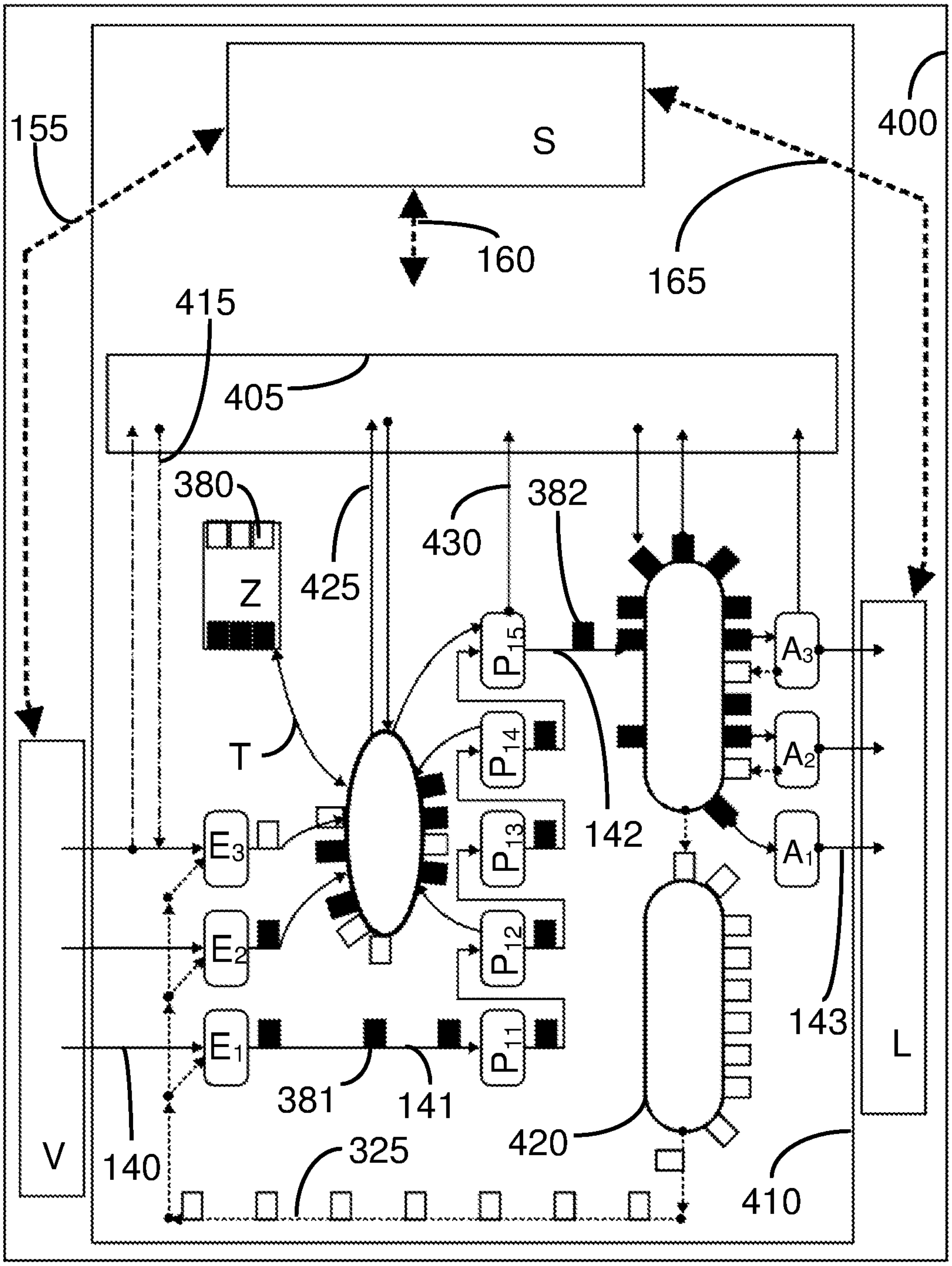
FIG. 4 a device for recognizing, checking, counting, accounting and sorting objects of value and assembling packs of objects of value with a storage transport system which has a plurality of cyclically circulating transport loops.

FIG. 4 shows a system 400 for producing trustworthy packs of objects of value, in which the transport of the objects of value is effected within a mechatronic system 410 with the aid of a combined storage transport system. The mechatronic system 410 additionally has an area 405 with a higher security level. The area 405 is integrated in the storage transport system of the mechatronic system 410 with conveyor plants 425 for small transport containers 381 having untrustworthy packs of objects of value and conveyor plants 430 for small transport containers having trustworthy packs. Furthermore, with the aid of the conveyor plants 415, objects of value from the preparation level V can be directly stocked in the area 405 with the higher security level. In addition to the conveyor plants 141, 142, T and 325, the storage transport system likewise comprises cyclically circulating transport loops 420. Moreover, the mechatronic system 410 has a processing stage $P_1$ in which processing modules $P_{1n}$ are connected in series.

The area 405 with the higher security level can be utilized in the event of failures, processing bottlenecks or during maintenance work for the secure storage of the objects of value or for protecting them from theft or destructive influences such as fire. The conveyor plants 425 and 430 allow this to be done fully automatically. In addition, objects of value can be transported from the preparation stage V via the plants 415 directly to the area 405 without having to be forwarded to the entry stages $E_n$. This increases the receiving capacity of the system in a secure way, in particular when objects of value are delivered that can only be processed at a later time in the entry stage $E_n$.

Due to the series connection of the processing modules $P_{1n}$, the processing of the objects of value can be effected without detours and thus particularly quickly. In preferred embodiments, the system 410 has still further processing stages $P_2$, $P_3$, etc., which are not explicitly shown here.

The cyclically circulating transport loops 420 fulfil various tasks. On the one hand, they serve as dynamic temporary storages that can be accessed very quickly and easily by the mechatronic system 410. On the other hand, they serve to connect the entry stages $E_n$, the machines $P_n$ of the processing area P and/or the machines $A_n$ of the output area A in such a way that the transport paths of the objects of value can be designed optimally. For example, with the aid of the transport loops 420, individual modules $P_{1n}$ of the processing stage $P_1$ can be omitted or skipped, which are not needed for processing the objects of value, even though the modules $P_{1n}$ are connected in series.

Figure 5:
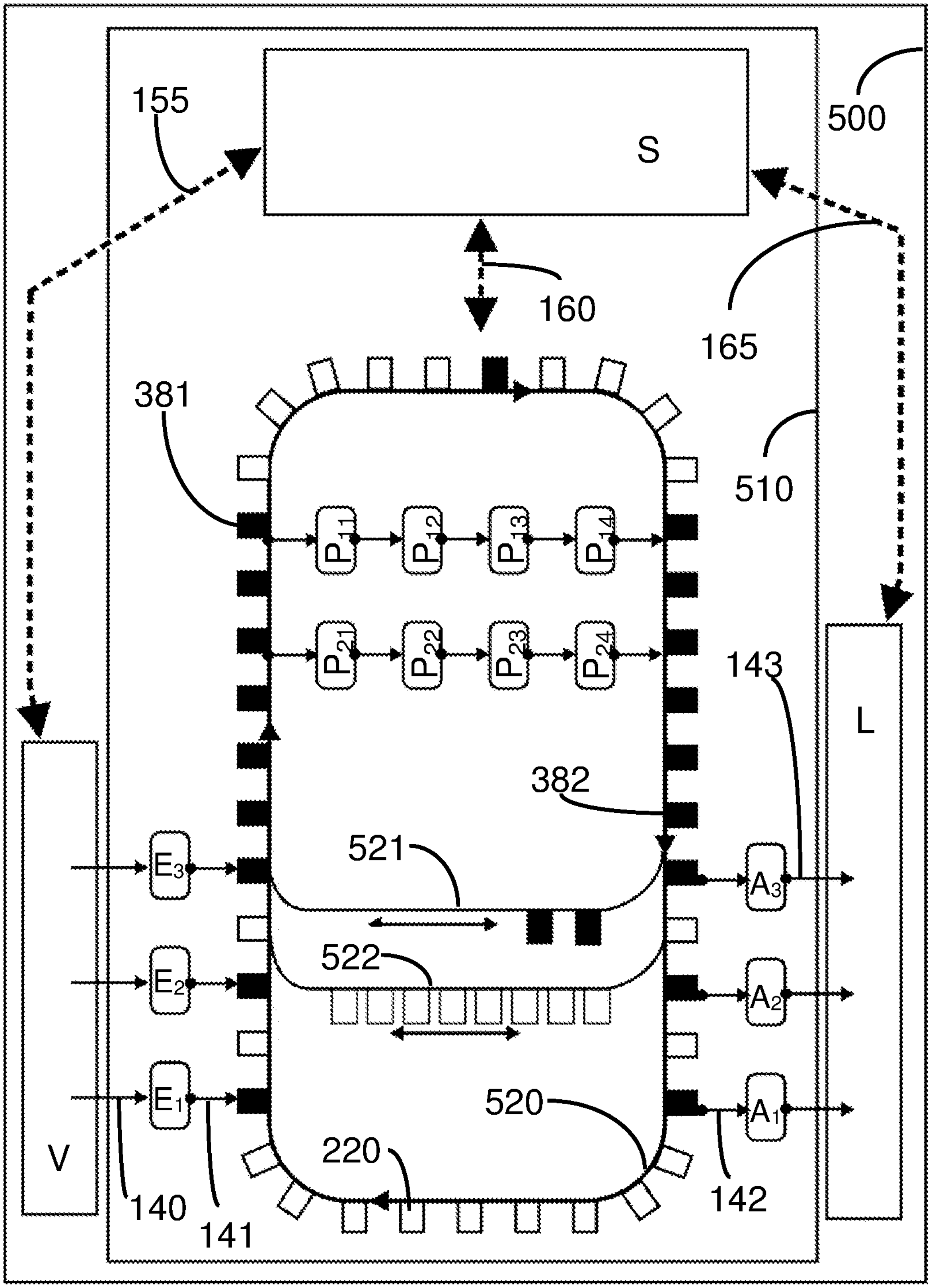
FIG. 5 a device for recognizing, checking, counting, accounting and sorting objects of value and assembling packs of objects of value with a storage transport system which consists of one single transport loop.

FIG. 5 shows a mechatronic system 510 as part of a system 500 having a branched cyclically circulating transport loop 520 with diverters 245, which interconnects both the entry stages $E_n$ and the machines $P_n$ of the processing area and the machines $A_n$ of the output area A of the system 500. In this embodiment, the machines comprise four processing modules $P_{n1}$, $P_{n2}$, $P_{n3}$ and $P_{n4}$, which again are connected in series. The use of an individual cyclically circulating transport loop 520 for connecting all the subsystems and components of the system 510 reduces the expenditures for diverters and/or grippers for connecting different conveyor plants. At the same time, this has the advantage that different entry stages $E_n$ and different output stages $A_n$ are attached to the transport loop 520 via transfer devices 141 and 142. Thus, with the aid of advance information IV, the filling of the small transport containers with objects of value can be effected automatically at the appropriate stages $E_n$. Furthermore, the filling of the output containers with trustworthy packs of objects of value can take place at the stages $A_n$ specially suitable therefor. The transport loop 520 may have branched shortcuts 521 as well as branched storage tracks 522 or also passing lanes, with which the position and order of the containers on the transport device 520 can be changed by the control S as required. In the embodiment example, the two processing module chains $P_1$ and $P_2$ drawn have different performance parameters for different tasks. Thus, the system 500 can, e.g., perform slow high-precision checks on the one module chain and at the same time perform a quick processing of large quantities in a short time on the second module chain.

Figure 6:
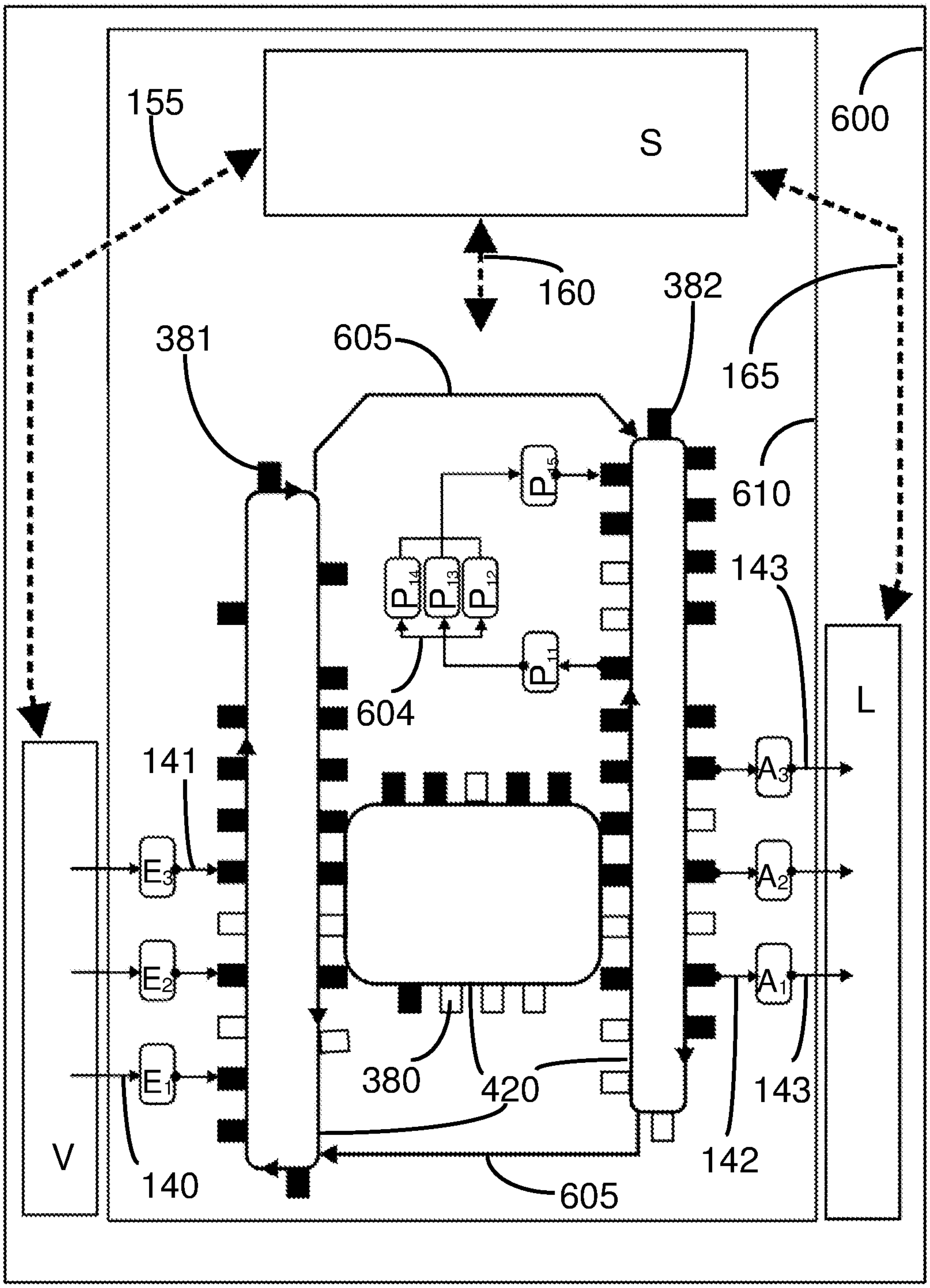
FIG. 6 a device for recognizing, checking, counting, accounting and sorting objects of value and assembling packs of objects of value with a storage transport system and a configurable equipment or machine for recognizing, checking, counting, accounting and sorting objects of value.

FIG. 6 shows a mechatronic system 610 as part of a system 600 with at least one passing lane 605. Furthermore, three cyclically circulating transport loops 420 are coupled to each other in such a way that they interconnect the entry stages $E_n$, the processing stage $P_1$ and the output stages $A_n$ of the mechatronic system 610. The processing modules or processing devices $P_{1n}$ of the processing stage $P_1$ are also connected partly in series and partly in parallel. They can be triggered via activatable diverters 604, e.g. on the basis of advance information IV and output information IA. The Figure shows an activated configuration, whereby other configurations can also be produced and operated via the control S.

On the one hand, the parallel-connected processing modules $P_{12}$ to $P_{14}$ can be employed to increase the cycle rate for processing the objects of value by employing several modules simultaneously and thus reduce the processing time of orders. On the other hand, the modules connected in parallel can also fulfil various functionalities that are available for processing the objects of value by selectively controlling the transport paths. The five processing modules $P_{1n}$ shown in the example can therefore be understood as a configurable machine for recognizing, checking, counting, accounting and/or sorting objects of value.

The use of three coupled transport loops in the system 610 also allows a realization of more flexible transport paths for the small transport containers or transport containers 380, 381, 382. Employing the passing lanes 605 moreover allows the realization of transport paths in which the middle one of the transport loops 420 is skipped. By activating the passing lane at exactly the appropriate place, exactly the desired small transport container is transported as quickly as possible between the transport loops that do not come into direct contact. This device permits the system to operate without a separate return transport track because the empty containers 380 can be transported via the passing lane to the entry stages $E_n$ where they are received by the entry stages $E_n$. The refilling of the small transport containers 380 is then effected by means of new objects of value coming from the preparation stage V via the transport tracks 140.

Figure 7:
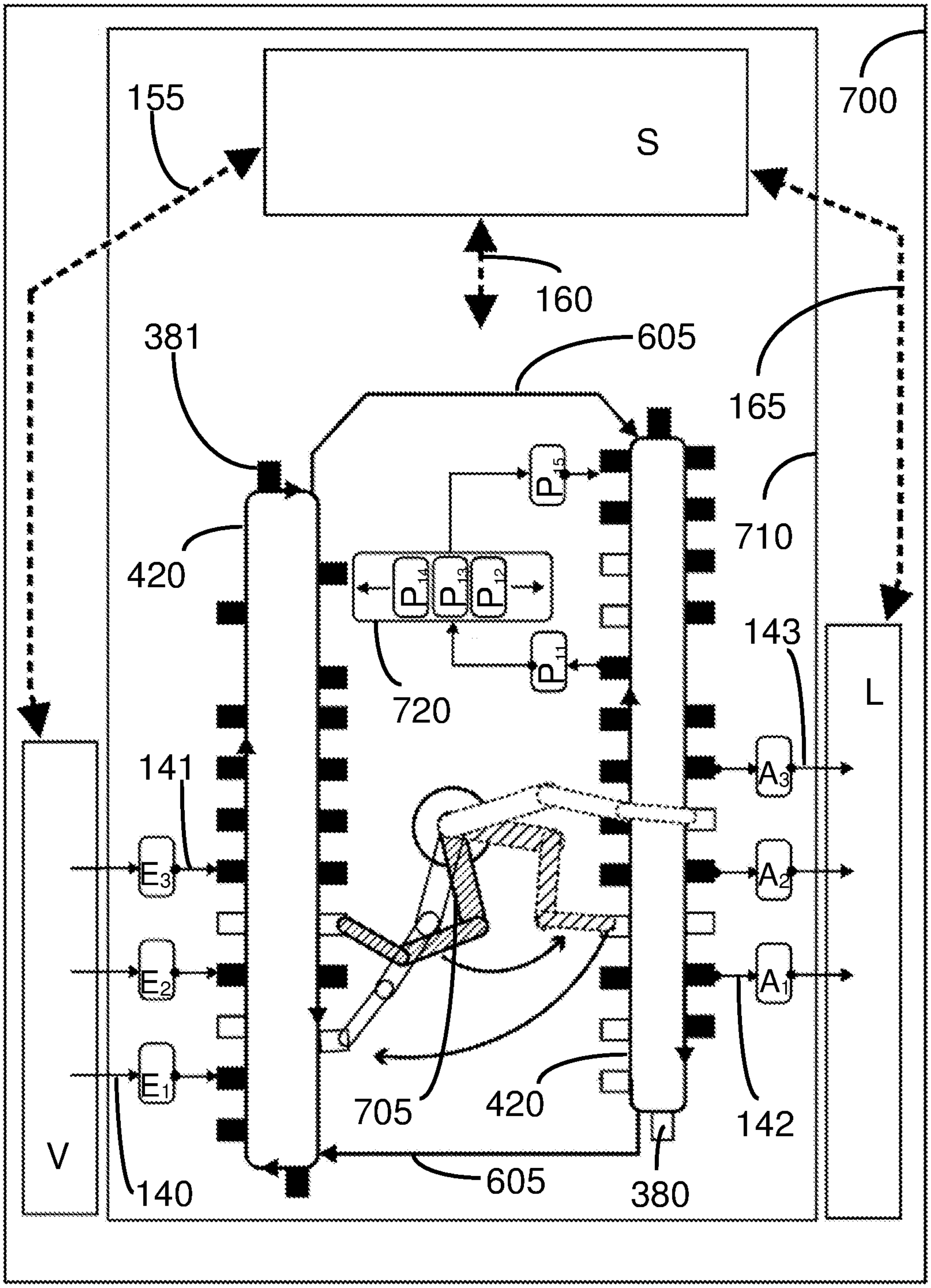
FIG. 7 a device for recognizing, checking, counting, accounting and sorting objects of value and assembling packs of objects of value with a storage transport system in which two transport loops are connected with the aid of a pick-and-place robot.

FIG. 7 shows a powerful and complex mechatronic system 710 as part of a system 700 in which at least one three-dimensionally movable pick-and-place robot 705 couples two cyclically circulating transport loops 420 to each other. The pick-and-place robot 705 allows a direct and targeted access to individual small transport containers 380, 381 and 382. Moreover, the mechatronic system 710 has a processing stage with processing modules $P_{11}$ to $P_{15}$.

The pick-and-place function is preferably used to directly grab a small transport container with suitable contents and transport it to the appropriate handover point, e.g. to a free place on the transport loop or directly to a processing module $P_{1n}$ or A-machine or also E-machine. The pick-and-place robot 705 can also be employed to change the order of the small transport containers on the conveyor plants, such as in this example the transport loops 420, or to transport small transport containers from one transport loop to the other. In a particularly preferred embodiment, a gripping device 705 is utilized to move the small transport containers between different layers of transport loops or storage transport levels disposed vertically one above the other. This permits a particularly space-saving construction.

Figure 8:
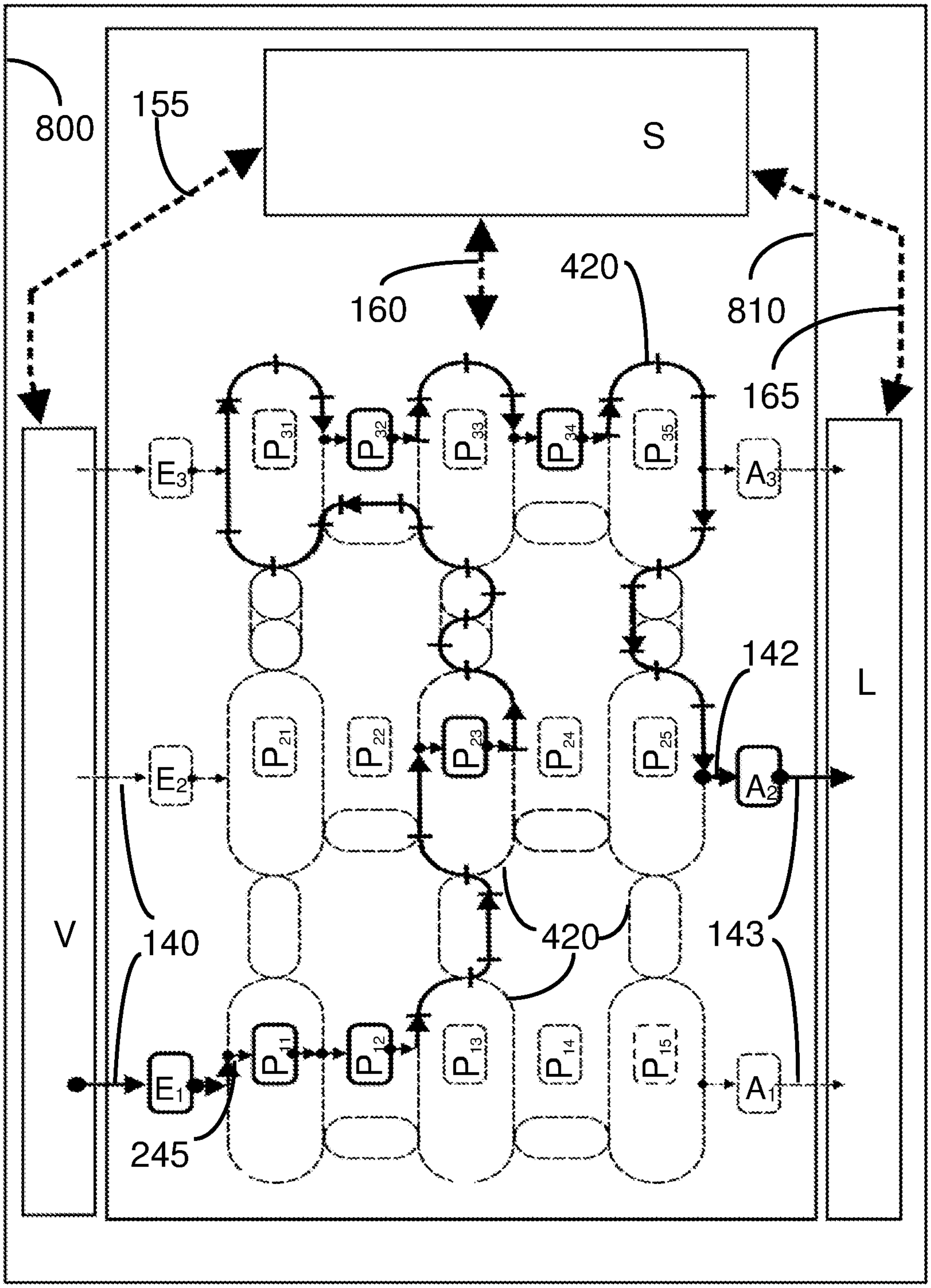
FIG. 8 a device for recognizing, checking, counting, accounting and sorting objects of value and assembling packs of objects of value with a storage transport system which consists of a plurality of interconnected transport loops.

FIG. 8 shows a mechatronic system 810 as part of a system 800 comprising a plurality of modular and individually activatable and controllable cyclically circulating transport loops 420 and a plurality of processing modules $P_{1n}$ disposed in matrix form and interconnected in such a way that each of the processing modules $P_{1n}$ activated by the control S can take the objects of value from the formed transport path or from the transport loops 420 and deposit them back onto the same or another cyclically circulating transport loop 420 after processing. The transport loops 420 are interconnected in a precisely controlled manner, typically by further cyclically circulating transport loops or turntables, so that objects of value can be transported to all places of the mechatronic system 810 which are intended for transport or processing of the objects of value. For illustration purposes, a possible transport path is marked with a solid black line, while the modules and plants not involved in this path are shown with dashed lines.

In the preferred embodiment, the transport loops 420 contact each other in constructional members that have a diverter function, so that the path of the small transport containers can be reliably controlled. The small transport containers are transported on the transport loops 420 with the aid of adhesive friction and sliding friction. The small transport containers are brought to a halt at the appropriate positions so that the small transport containers and/or the objects of value can be taken therefrom.

Such a network of conveyor plants 141, 142 and 420 allows very diverse and flexible transport and processing paths and is therefore very adaptable. In particular, it allows to direct objects of value or packs of objects of value in targeted fashion to individual or a defined sequence of processing modules or processing machines $P_{1n}$. The same applies to the supply systems of the output modules or machines $A_n$, in which the trustworthy packs of objects of value are configured and packaged for the purpose of outbound delivery. In this way, the mechatronic system becomes almost fully configurable in terms of its function and its components, devices and processing modules.

Figure 9:
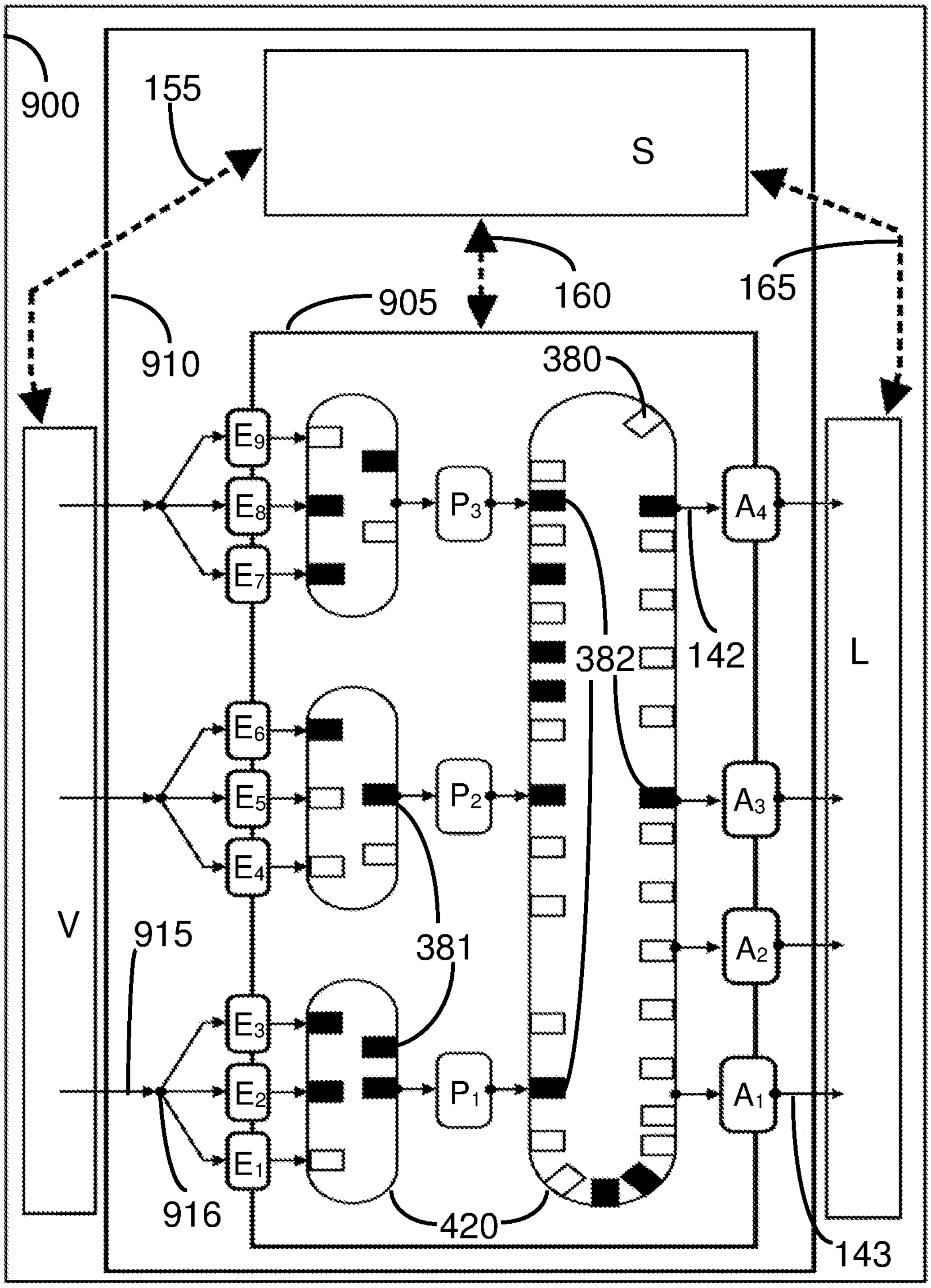
FIG. 9 a device for recognizing, checking, counting, accounting and sorting objects of value and assembling packs of objects of value with an area for unqualified objects of value and an area for qualified objects of value.

FIG. 9 shows a mechatronic system 900 as part of a system 900 which is surrounded by a security partition wall or security housing 905. The housing 905 allows the area where the objects of value are processed to be distinguished with a higher level of security, as no personnel can enter the space created by the housing 905 when the system 900 is in operation. In many failure events, the objects of value can remain inside and do not have to be outsourced in additional steps to other areas with a higher security level. For this purpose, the machines $E_n$ and A and, with a suitable construction, also the machines $P_n$ are mounted on the security partition wall on the maintenance side and in case of maintenance work access to the interior is not possible. Consequently, it is not necessary to clear the entire interior space 905 for maintenance work.

In addition, the mechatronic system 910 has at least one diverter 916 (or other connection module) that is attached to the preparation stage V with the aid of conveyor plants 915 and forwards objects of value to the entry stages $E_n$ of the secured processing system 910 with the aid of further conveyor plants 915. Therefore, all input points $E_n$ are redundant and designed to be particularly fail-safe. The feed to the appropriate input points $E_n$ and the activation of the suitable functions in the input E is effected by the control S, in particular in dependence on advance information IV obtained in the preparation stage V. With the diverters 916, objects of value can be distributed in parallel to several entry stages $E_n$. This permits jams to be avoided during the processing of inbound deliveries. Such a parallelization is not only possible for the transport of objects of value to the entry stages $E_n$. The transport between the entry stages $E_n$ and/or the machines $P_n$ and/or $A_n$ can also be parallelized in this way (not explicitly drawn).

The mechatronic system 910 is constructed such that the entry stages $E_n$ and the processing stages or processing machines $P_n$ are connected with the aid of cyclically circulating transport loops 420. Furthermore, the processing machines $P_n$ are likewise connected to the output machines $A_n$ with the aid of a cyclically circulating transport loop 420. The storage transport system for objects of value in the mechatronic system 910 presents itself in two parts in this embodiment example. Small transport containers 381 with untrustworthy contents are separated from small transport containers 382 with trustworthy contents. The cyclically circulating transport loops 420 which connect the entry stages $E_n$ and processing machines $P_n$ of the processing area, only transport objects of value that have not yet been processed by the machines $P_n$. The cyclically circulating transport loops 420, which connect the processing machines $P_n$ and the output machines $A_n$, only transport objects of value that have already been processed and thus validated. This allows a clear spatial demarcation between processed and not yet processed objects of value in the mechatronic system 910.

Figure 10:
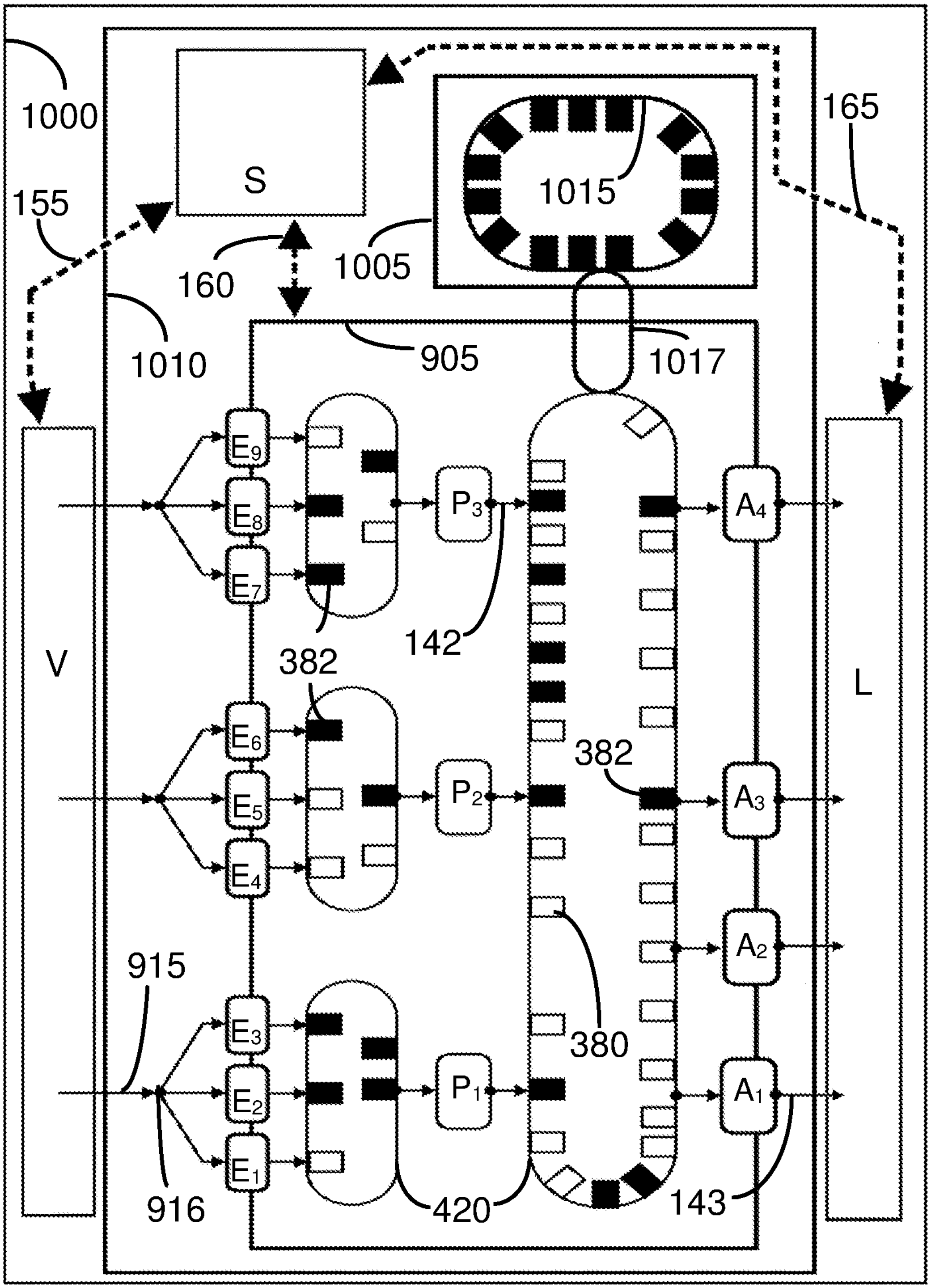
FIG. 10 a device for recognizing, checking, counting, accounting and sorting objects of value and assembling packs of objects of value with an area for unqualified objects of value and an area for qualified objects of value which is attached to an area with a higher security level.

FIG. 10 shows a mechatronic system 1010 as part of an overall system 1000, which is surrounded by a security housing 905 and moreover has an area 1005 with an even higher security level. The area 1005 with an even higher security level is attached to at least one of the transport loops 420 with the aid of at least one secure and efficient transport device, e.g. cyclically circulating transport loop 1017. Within the area 1005, likewise a cyclically circulating transport loop 1015 is preferably employed, which is connected to the cyclically circulating transport loop 1017. The two room areas 1005 and 905 are separated in terms of security technology and are preferably only accessible through locks. When these locks are open, transport via 1017 is possible.

The security housing 905 and the additional blockable security area 1005 allows the mechatronic system 1010 to react to failures in different ways. In the case of simple failures that can be easily and quickly remedied, it is usually not necessary to remove all the objects of value or all the filled small transport containers 381 and 382 from the transport loops 420 or conveyor plants 1017 or the entry stages $E_n$, the processing machines $P_n$ and the output machines $A_n$. In the event of serious failures, such as fire outbreak, it is in most cases necessary to move all the objects of value from the less secured areas 905 of the mechatronic system 1010 to more secured areas 1005. As there are two different security areas in this embodiment, on the one hand, downtimes due to the just described failures can be reduced, and on the other hand, security measures for reacting to a multitude of different failures can be kept available.

Figure 11:
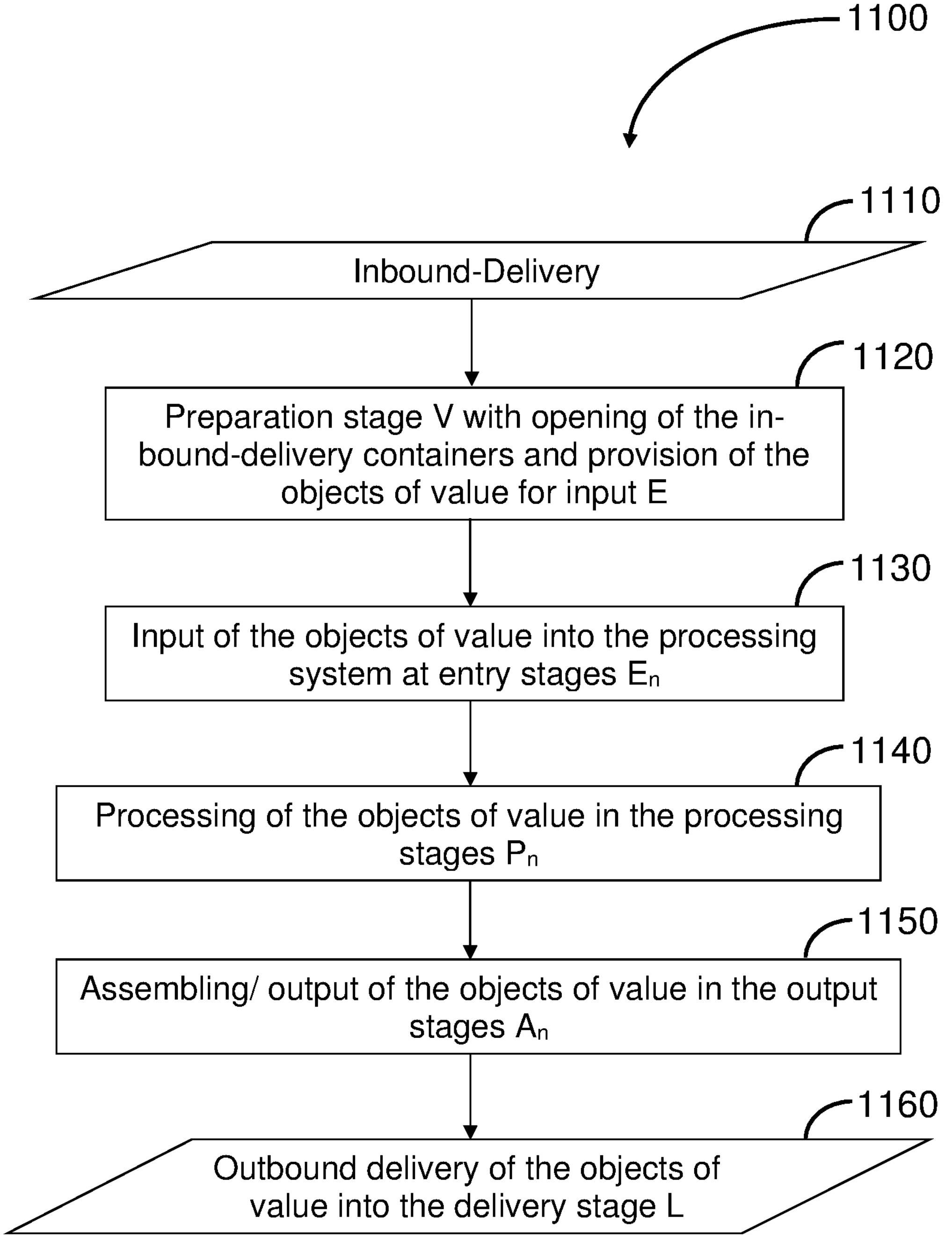
FIG. 11 rough flowchart of a method for controlling a system or a device for recognizing, checking, counting, accounting and sorting objects of value and assembling packs of objects of value.

FIG. 11 shows the course of a method 1100 for operating a system for recognizing, checking, counting, accounting and sorting objects of value and assembling packs of objects of value. It is thus a method for producing trustworthy packs of objects of value. An important case of application is the processing of bank notes in a cash center. The method begins with the inbound delivery 1110 of objects of value at a preparation stage V, coming from the inbound delivery ramp or from a temporary stock or from the vault area. In the preparation stage V, the next step 1120 of the method according to the invention takes place, in which advance information IV regarding the objects of value is corrected and/or generated and/or confirmed and/or complemented. The objects of value are forwarded to entry stages $E_n$ in a subsequent step 1130. In at least one of the processing machines $P_n$, the objects of value are qualified and quantified, i.e. recognized, checked, counted and/or sorted, in step 1140. Furthermore, the value information of the objects of value is transmitted to the control S or another corresponding information and/or control unit for accounting. In the next step 1150, the qualified and quantified objects of value are assembled and outputted. The assembled packs of objects of value are now ready for the outbound delivery 1160 at the post-processing stage L.

The control S monitors, examines and controls the provision and activation of the required stages, modules and machines $E_n$, $P_n$ or $P_{nm}$, $A_n$, 140, 141, 142, 143, T, 325, 420, 1017, . . . and the individual method steps. For this purpose, the control S collects and uses information from the preparation stage V, the mechatronic system 110, 210, 310, 410, 510, 610, 710, 810, 910 or 1010 and the post-processing stage L.

The process can also have intermediate steps that have not been mentioned, it can combine steps and go through them in a different order.

The method allows a comprehensive control and examination and thus optimal processing of the objects of value, which can be adapted to changing delivery and demand conditions. In this way, the method increases the reliability, security and plannability of the system.

Figure 12:
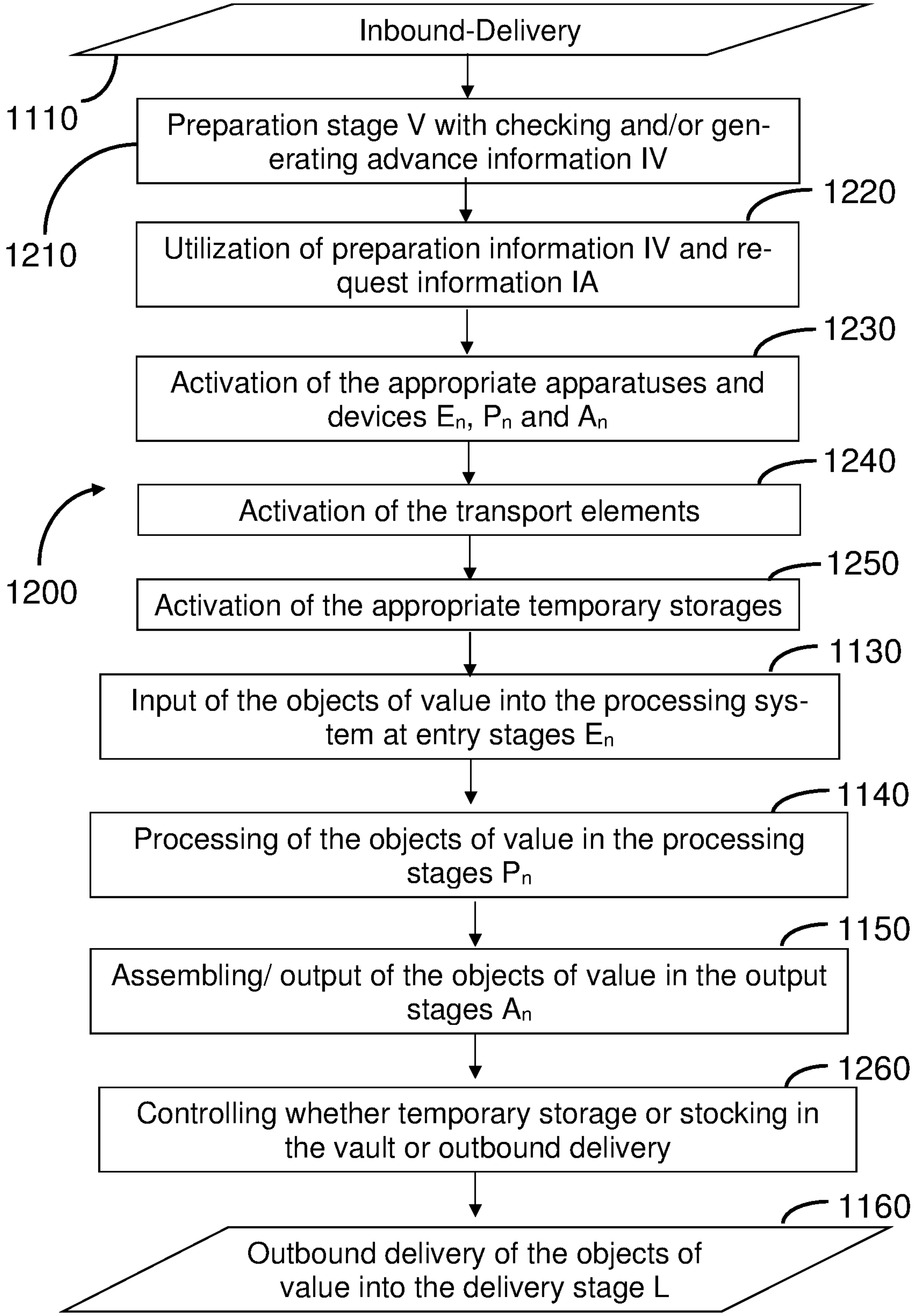
FIG. 12 a method for controlling a system or a device for recognizing, checking, counting, accounting and sorting objects of value and assembling packs of objects of value.

FIG. 12 shows the steps according to the invention for controlling the processing system, its stages and modules in further exemplary details.

Step 1210 consists of checking and/or generating and/or complementing and/or correcting the preparation information in the preparation step V.

Step 1220 includes utilizing advance information in a controlling information technology system and/or the control S. Preferably, a combination of the advance information IV from the preparation area V with the request information IA from the delivery stage L is effected. In addition, further information from future predictions and past evaluations based on digital data analyses is added as required and available.

Step 1230 comprises sending control signals to the processing system 100, 200, 300, 400, ff. This controls the provision, linking and activation of the stages, modules and machines. In addition, the appropriate configuration is effected on the machines, in particular the interconnection of the individual processing modules $P_{nm}$.

In step 1240, the activation of the transport elements, e.g. with regard to direction, speed, diverter position, etc., is effected not only on the basis of the advance information IV, but in particular on the basis of the status information, where exactly which small transport containers with which filling are located, and the request information IA. Thus, the control S controls the position and movement of the objects of value and the possibility of accessing the objects of value.

In step 1250, the activation of appropriate temporary storages Z is effected, e.g. in order to bring objects of value stored outside the processing area or small transport containers with objects of value into the storage transport system when the system is started.

In step 1130, the control of the input of the prepared objects of value is effected, the advance information IV being utilized to control the most appropriate entry stages $E_n$.

In step 1140, the activation, combination, control and of the most appropriate processing modules $P_{nm}$ as well as the conveyor plants and temporary storage Z is effected.

Step 1150 comprises assembling and outputting the trustworthy packs of objects of value in the output stages $A_n$, likewise controlled via advance information IV and request information IA.

Step 1260 includes deciding whether to outbound-deliver or stock the finished trustworthy packs of objects of value.

Step 1160 comprises, when an outbound delivery decision is made, the secure handover to the delivery stage L and the outbound delivery of the trustworthy packs of objects of value.

According to the method described herein for producing trustworthy packs of objects of value, e.g. bank notes pass through at least one subsystem or stage $E_n$ for the input, at least one subsystem or stage $P_n$ for processing or for the recognizing and sorting processing, and at least one subsystem or stage $A_n$ for assembling and outputting defined and trustworthy packs of objects of value. In addition, there is present at least one subsystem S for control and at least one adaptive subsystem for transport which consists of conveyor plants and, if required, subsystems Z for temporary storage and buffering semifinished packs of objects of value. In most cases, there is also a connection to existing vault or stocking systems.

The method is based on the system-controlled filling, movement and emptying of small transport containers, which can be designed e.g. as containers, grippers or clamps. According to the invention, the processing plan of how to move and process the small transport containers that can be filled with objects of value is worked out by the control S, which utilizes advance information IV, operating condition information IP and preferably also request information IA for this purpose.

The usually first step of the method is to receive objects of value or packs of objects of value, which are still in inbound delivery containers, in a preparation stage V and to prepare them for the further processing steps. This preparation stage V, in the sequence, lies still before the subsystem E for input but according to the invention V already provides advance information IV in order to control the system and the subsystems E, P, A, T, Z, etc.

In the preparation stage V, the delivered objects of value are positioned in a receiving means where they can be fed to further processing by one of the entry stages $E_n$. These processing steps can also be included in a comprehensive optimization of the processing of the objects of value and of the packs of objects of value by the system.

Thereafter, the objects of value can already be placed in small transport containers 380, which thus contain as their contents a quantity of objects of value that is not precisely defined and not yet defined as trustworthy. These small transport containers 381 are preferably utilized to transport the objects of value from the preparation stage V to the input stations $E_n$ via an adaptively controlled upstream preparatory transport system. Triggering the appropriate input stations $E_n$ is performed by the control S in particular on the basis of the advance information IV.

The system has available, often at the same time with numerous pieces of advance information IV, numerous pieces of request information IA for requesting packs of objects of value to be delivered. This request information IA includes which customer should receive which number of which objects of value as a trustworthy pack. Alternatively, this request information IA arrives not until during the ongoing processing or it is predicted based on data analyses.

There is thus advance information IV which is generated and/or received and/or utilized in the preparation stage V, and request information IA which is generated and/or received and/or utilized in the system of the invention.

A control unit S receives advance information IV, request information IA and performance information IP, e.g. about the availability of apparatuses and elements E, A, P, T, Z in the system, as well as information IT about the condition of the conveyor plants and the position of the transport containers or objects of value in the system. Depending on all this information, the system now controls the further processing via transporting, measuring, checking and sorting up to the assembling and outbound delivery of the requested trustworthy packs of objects of value.

The objects of value are handed over to at least one transport system in the subsystem area P, which ultimately forwards the objects of value to at least one device $P_n$ for recognizing, checking, counting, accounting and/or sorting objects of value. Preferably, the handover of the filled small transport containers 381 takes place via the input E to the adaptive transport system, which leads to the activated processing modules $P_{nm}$. According to the invention, also the adaptive transport system is controlled on the basis of the advance information IV, the operating condition information IP or IT and/or on the basis of the request information IA, preferably by advance information IV in combination with request information IA.

The subsystem P with its devices and automatic machines performs the processing, in particular selected from recognizing, checking, counting, accounting and sorting of objects of value. In the subsystem area P, ready apparatuses and/or elements are combined into an activated subsystem P in order to recognize and/or sort and/or count and/or check and/or account and/or forward the objects of value as required. In the preferred case, the control S produces the activated subsystem P for processing in an optimized manner, whereby elements that are not required are not activated or used elsewhere.

The control of the transport path of the small transport containers and/or the utilization of the apparatuses in the processing subsystems $P_n$ or $P_{nm}$ depends on the preparation information IV and/or the request information IA and/or the performance information IP and/or the information IT etc., i.e. on all the information that is taken up, processed and sent by the control S. The objects of value are taken from the small transport containers preferably for the purpose of processing and are subsequently recognized and/or checked and/or counted and/or sorted in at least one processing stage or processing unit $P_n$, so that trustworthy and absolutely defined information about the objects of value with regard to quality, authenticity, value etc. is the result. The trustworthy value information for the production of semifinished trustworthy packs or finished trustworthy packs of objects of value or bank notes is created in the processing system P.

The processing of the objects of value produces, by means of e.g. sorting and counting, absolutely defined and trustworthy objects of value and therefrom, depending on control instruction, packs of objects of value to which the value information is assigned. These trustworthy packs do not necessarily have to be the requested packs at this point, but can be semifinished packs that are further transported and/or temporarily stored.

Semifinished trustworthy packs are filled into suitable small transport containers and/or directed to other suitable containers or devices depending on trustworthy value information and request information IA. These semifinished trustworthy packs with value information are preferably surrounded by secure small transport containers. If required, they are temporarily stored in subsystems Z or in the transport system or are directly forwarded to the assembling and subsequent output A. The control S controls the temporary storing and/or forwarding depending on the preparation information IV and/or the request information IA etc.

After processing in at least one subsystem P, the trustworthy packs of objects of value produced are preferably guided by an adaptive transport system to assembling and output A in dependence on the request information IA. The assembling as part of subsystem A produces from appropriate, defined and trustworthy packs with suitable value information the requested defined and trustworthy packs with the requested value information. In the output subsystem A, these are placed in outbound delivery containers and the outbound delivery containers such as safe bags, Nota Tracc Trays or ATM cassettes are closed. Alternatively, the outbound delivery packs are securely wrapped in foil, e.g. if entire packs of bundled sorted-out bank notes are to be delivered back to the central bank. The outbound delivery packs are further transported through the outbound delivery device, e.g. a lock, for the outbound delivery to customers through an outbound delivery transport system, which is usually effected by transport devices outside the system according to the invention and whereby no small transport containers but outbound delivery containers are transported.

In the preferred embodiments, the system comprises a system for processing-control S that controls the activation and combination of the subsystems, apparatuses and devices. In addition, the system may have a processing information system for managing, in particular, the value information and ownership information of the objects of value in association with the packs of objects of value in the system. Such a processing-information system permits the identification of the objects of value stored in the small transport containers and fed to the output packs and the deliveries produced with these. Here, attention is paid to the highest level of security and freedom from faults in order to maintain the trustworthiness achieved in the processing in the subsystem P.

The method is characterized in particular by the fact that already in the preparation stage V the advance information IV used by the control S is generated, which advance information is utilized for controlling the system and the subsystems. At the same time, the value information generated in the processing P is managed by means of the control S or another control information system so that the trustworthy packs can be produced and delivered at the highest security level. Moreover, it goes without saying that the accounting of the inbound-delivered objects of value and their allocation to an account is effected correctly.

Glossary

Conveyor Plant

Conveyor plants are machines and plants that are used to convey goods to be conveyed, such as transport containers. They can be divided according to the type of goods to be conveyed into conveyors for piece goods (e.g. boxes or containers) and conveyors for bulk goods (e.g. coins). Examples of conveyor plants are belt, roller or chain conveyor systems, also known as continuous lines, pick-and-place robots or vehicle systems that comprise autonomously acting modules with their own drive.

Nota Tracc Tray

A Nota Tracc Tray is a multifunctional storage and securing system for bank notes. Nota Tracc Trays can be designed with or without a protective cover and are stackable in both variants. They are suitable for the operation in a cash center, for example. To ensure the security of the cash, the trays are made of a special unbreakable plastic material. A Nota Tracc Tray is available in 3 versions for up to 3,000, 4,000 and 5,000 bank notes, and each version is obtainable with a transparent protective cover.

Pick-And-Place Robot

A pick-and-place robot is an industrial robot that can move workpieces or bins to an arbitrary position within its radius of action with the aid of a gripper arm or a rail system.

Transport Container or Small Transport Container

A transport container or small transport container is a device for taking up a not necessarily precisely defined quantity of objects, which ensures that the objects are not damaged during transport and/or cannot be removed. For this purpose, the container can be designed to be closable, for example. They can be boxes, cans, clamps, grippers or enclosing devices.

Processing Module

A processing module is a machine or part of a machine for recognizing, counting, checking, accounting or sorting objects of value. Processing modules are integrated in processing stages in serial or parallel sequence. Several processing modules can also be brought together into one module with several functionalities for recognizing, counting, checking, accounting or sorting objects of value, e.g. in order to process bank notes of different currencies.

Processing Stage

A processing stage is a machine that usually comprises several processing modules for recognizing, counting, checking, accounting or sorting objects of value. Processing stages are used to produce trustworthy packs of objects of value, e.g. banded packs of bank notes that may comprise one hundred or one thousand bank notes.

Trusted Packs of Objects of Value

A trustworthy pack of objects of value has objects of value, e.g. bank notes or coins, in a precisely defined quantity (number) and quality (authenticity, good condition, denomination and other value parameters) which both are known with the highest degree of certainty. It may be surrounded by a secure wrapping or band or a transport container.

Cyclically Circulating Transport Loop

A cyclically circulating transport loop is, e.g., a circulating transport band on which, e.g., object carriers or transport containers are transported. Cyclically circulating transport loops can be linked into networks by installing diverters that decide in which direction the object carriers are moved.

REFERENCE SIGNS

- 100 system for producing trustworthy packs of objects of value
- V preparation stage
- 110 mechatronic system
- L delivery stage or post-processing stage
- S control of the mechatronic system 110
- E input area with entry machines and/or entry stages of the mechatronic system 110
- P processing area with processing stages of the mechatronic system 110
- A output area with output machines and/or output stages of the mechatronic system
- Z temporary storage of the mechatronic system 110
- T conveyor plant
- IV information from the preparation stage V
- IA information about requested packs of objects of value
- IP performance information
- IT information about conveyor plants and temporary storages
- 140 conveyor plant from preparation stage V to entry area E
- 141 conveyor plant on the way from E to P
- 142 conveyor plant on the way from P to A
- 143 conveyor plant from A to the delivery or post-processing stage L
- 155 information channel between preparation stage V and control S
- 156 additional information about expected inbound deliveries
- 160 information channel between mechatronic system 110 and control S
- 161 information regarding the condition and position of the objects of value
- 162 information for controlling the input E
- 163 information for controlling the processing modules or machines in the area P or the quantifying and qualifying processing
- 164 information for controlling assembling and output
- 165 information channel between the post-processing stage L and the control S
- 166 additional information about expected orders
- 200 systems for recognizing, checking, counting, accounting and sorting objects of value and assembling packs of objects of value
- 210 mechatronic system
- $E_n$ entry stage of the input area E of the mechatronic system 210
- $P_n$ processing stage or machine of the processing area P of the mechatronic system 210
- $A_n$ output stage or machine of the output area A of the mechatronic system 210
- 245 diverters for conveyor plants 141, 142 and/or T
- 300 system for producing trustworthy packs of objects of value with a storage transport system
- 310 mechatronic system with a storage transport system
- 325 conveyor plant for returning empty transport containers
- 380 small transport container empty
- 381 small transport container filled with NON-trustworthy packs of objects of value
- 382 small transport containers filled with trustworthy packs of objects of value
- 400 system for producing trustworthy packs of objects of value with an area of higher security level
- 405 security area with higher security level
- 410 mechatronic system with secure temporary storage 405
- 415 conveyor plant for the transport of objects of value between the preparation level V and the area with a higher security level
- 420 cyclically circulating transport loop as storage transport element
- 425 conveyor plant between storage transport system and security area 405 for small transport containers 381
- 430 conveyor plant for the transport of objects of value between areas with different security levels within the mechatronic system for small transport containers 382

$P_{nm}$ processing modules of a processing stage or machine $P_n$, of the processing area P of the mechatronic system 410

500 system for producing trustworthy packs of objects of value with a branched cyclically circulating transport loop

510 mechatronic system with branched cyclic circulating transport loop

520 branched cyclically circulating transport loop

521 shortcut track in the storage transport system

522 storage track in the storage transport system

600 system for producing trustworthy packs of objects of value with a direct transfer lane

604 diverter for branching within the processing stage $P_1$

610 mechatronic system with transfer lanes

700 system for producing trustworthy packs of objects of value with a pick-and-place robot

705 pick-and-place robot for directly picking up and feeding selected small transport containers

710 mechatronic system with a pick-and-place robot

720 magazine

800 system for producing trustworthy packs of objects of value with a plurality of networked conveyor plants 141, 142 and 420

810 mechatronic system with a plurality of networked conveyor plants 141, 142 and 420

900 system for producing trustworthy packs of objects of value with security housing

905 security housing

910 mechatronic system with security housing

915 conveyor plant from the preparation stage V to a diverter

916 diverter for conveyor plant 915

1000 system for producing trustworthy packs of objects of value with temporary security storage

1005 temporary security storage with higher security level

1010 mechatronic system with temporary security storage 1005

1015 transport loop within the area with higher security level

1017 transport loop for connecting one of the transport loops 420 with the transport loop 1015 in the temporary security storage

1100 method for controlling a system for recognizing, checking, counting, accounting and sorting objects of value and assembling packs of objects of value

1110 inbound delivery to preparation stage V

1120 opening the inbound delivery containers in the preparation stage V

1130 input of the objects of value into entry stages $E_n$

1140 processing objects of value in the processing area P

1150 assembling and outputting packs of objects of value

1160 outbound delivery of objects of value in the delivery stage L

1200 method for producing trustworthy packs of objects of value with control on the basis of advance information

1210 opening inbound delivery containers at preparation stage V and receiving and/or checking and/or generating advance information IV

1220 utilization of preparation information IV and request information IA

1230 activation of appropriate apparatuses and devices in E, P and A

1240 activation of the transport elements

1250 activation of the appropriate temporary storage Z

1260 controlling whether temporary storage or stocking in the vault or outbound delivery

The invention claimed is:

1. A method for controlling a system comprising at least one preparation stage and having equipment for recognizing, checking, counting and sorting objects of value and for assembling packs of the objects of value, wherein the method comprises the following steps:

receiving objects of value in the preparation stage;

subsequently forwarding the objects of value from the preparation stage to at least one entry stage of the equipment;

then forwarding the objects of value to a first processing area of the equipment, which area comprises one or several processing stages in which the objects of value are processed, in particular recognized and/or checked and/or counted and/or sorted;

then forwarding the objects of value to a second processing area of the equipment, which area has one or several output stages in which the objects of value are processed, in particular assembled and/or outputted from the equipment;

wherein that advance information about the objects of value received in the preparation stage is present in the system, in particular advance information concerning the packaging and/or the composition and/or the denomination and/or the origin and/or the quality and/or the condition and/or the authenticity of the objects of value received, and that the advance information is utilized by the system, in particular by a control of the system;

wherein that request information about packs of objects of value to be delivered outbound by the system is evaluated together with the advance information present in the system, in particular it being checked whether the properties of the objects of value inbound-delivered to the system, which are contained in the advance information, match the properties of the objects of value of the packs of objects of value to be outbound-delivered by the system, and if yes, the inbound-delivered objects of value concerned are processed by the system in a prioritized manner.

2. The method according to claim 1, wherein that the objects of value are checked in the preparation stage for advance information about the objects of value.

3. The method according to claim 1, wherein that the advance information present in the system is available with the inbound delivery of the objects of value and/or is delivered along with the objects of value.

4. The method according to claim 1, wherein that the advance information present in the system is obtained on the basis of documentation of previous orders for which the system was used to process objects of value.

5. The method according to claim 4, wherein the documentation of previous orders comprises processing times and/or processing costs of the system.

6. The method according to claim 1, wherein that the advance information present in the system is obtained by measuring and/or observing the properties of the delivered objects of value, in particular a pattern recognition system in the preparation stage checking the inbound-delivered objects of value for soiling or destruction or denomination in order to obtain advance information.

7. The method according to claim 1, wherein the packs of objects of value to be delivered outbound by the system are those for which an order has been placed with the system.

8. The method according to claim 7, wherein that the request information about the packs of objects of value to be delivered outbound contains details about
- the depositor and/or orderer and/or
- the quantity and/or
- the packaging and/or
- the composition and/or the denomination and/or
- the destination and/or
- the intended use and/or
- the quality and/or the condition of the objects of value to be contained in the packs of objects of value to be delivered outbound.

9. The method according to claim 1, wherein that, in the case that, for the assembling of packs of objects of value to be delivered outbound, objects of value of a certain denomination are required, then, in order to optimize the processing of the objects of value, those objects of value inbound delivered to the system which have the denomination required for the assembling are processed by the system in a prioritized manner.

10. The method according to claim 1, wherein that external information sources and/or information about processing times and/or processing costs of the system are utilized to optimize the processing of the objects of value by the system.

11. The method according to claim 1, wherein that the system has at least one temporary storage, which is configured as a deposit surface, storage place or stocking place for the objects of value or as part of a transport system which has an inherent storage function.

12. The method according to claim 11, wherein that the at least one temporary storage is utilized for optimizing the processing of the objects of value, the at least one temporary storage being utilized in particular for temporary storing objects of value in order to counteract jams of the objects of value within the system.

13. The method according to claim 12, wherein
- that the objects of value received in the preparation stage are stocked in the at least one temporary storage before being processed, or
- that the objects of value which have passed through the at least one entry stage or have been recognized, checked, counted, accounted and/or sorted by a processing stage are stocked on the at least one temporary storage, or
- that the objects of value which have been recognized, checked, counted, accounted and/or sorted by a processing stage are stocked on the at least one temporary storage before they are assembled in the second processing area by an output stage.

14. The method according to claim 1, wherein that equipment of the first and second processing area is differently combined and/or activated and/or deactivated for optimizing the processing of the objects of value and/or of packs of the objects of value.

15. The method according to claim 1, wherein that in the preparation stage the objects of value are positioned in a receiving means in which they can be fed to the further processing in the first and/or second processing area.

16. The method according to claim 1, wherein that the advance information is utilized for optimizing the processing times of the respective objects of value by the system.

17. The method according to claim 1, wherein that the transport path of the respective objects through the system of value is selected in dependence on the advance information and/or that the combination of entry stages, processing stages and output stages with which the objects of value are processed in the equipment is decided on the basis of the advance information.

18. The method according to claim 1, wherein that
- the entry stage/s and/or the processing stage/s and/or the output stage/s that process the respective objects of value, and/or
- the transport path of the respective objects of value through the system are selected in dependence on the advance information, in particular in dependence on the composition and/or the denomination and/or the origin and/or the condition and/or the authenticity of the objects of value inbound delivered to the system.

19. The method according to claim 1, wherein that the objects of value are bank notes and that, for optimizing the processing of the objects of value, bank notes in good condition are processed by those processing stages of the system which process the bank notes at high speed, and bank notes in poor condition are processed by other processing stages of the system which process the bank notes at lower speed.

20. The method according to claim 1, wherein that for optimizing the processing of the objects of value, the entry stage/s and/or the processing stage/s and/or the output stage/s which process the respective objects of value are selected in dependence on the authenticity of the inbound-delivered objects of value, in particular in the case of inbound-delivered bank notes from partially filled ATM cassettes, which are delivered to the system, an authenticity check by the system being omitted and, in the case of inbound-delivered bank notes from other containers, an authenticity check being carried out by the system.

21. The method according to claim 20, wherein the other containers comprise safe bags.

22. The method according to claim 19, wherein the banknotes are taken from a partially filled ATM cassette delivered to the system.

23. The method according to claim 1, wherein that the system comprises a control that receives advance information and request information and utilizes both information items for generating control information for the system, the control information for optimizing the processing of the objects of value being used in particular for the system to select a certain transport path through the system for certain objects of value or to select certain processing stages and/or output stages for processing these certain objects of value.

24. A method for controlling a system comprising at least one preparation stage and having equipment for recognizing, checking, counting and sorting objects of value and for assembling packs of the objects of value,
- wherein the method comprises the following steps:
- receiving objects of value in the preparation stage;
- subsequently forwarding the objects of value from the preparation stage to at least one entry stage of the equipment;
- then forwarding the objects of value to a first processing area of the equipment, which area comprises one or several processing stages in which the objects of value are processed, in particular recognized and/or checked and/or counted and/or sorted;
- then forwarding the objects of value to a second processing area of the equipment, which area has one or several output stages in which the objects of value are processed, in particular assembled and/or outputted from the equipment;

wherein that advance information about the objects of value received in the preparation stage is present in the system, in particular advance information concerning the packaging and/or the composition and/or the denomination and/or the origin and/or the quality and/or the condition and/or the authenticity of the objects of value received, and that the advance information is utilized by the system, in particular by a control of the system;

wherein that the advance information present in the system is obtained on the basis of documentation of previous orders for which the system was used to process objects of value.

25. A method for controlling a system comprising at least one preparation stage and having equipment for recognizing, checking, counting and sorting objects of value and for assembling packs of the objects of value, wherein the method comprises the following steps:

receiving objects of value in the preparation stage;

subsequently forwarding the objects of value from the preparation stage to at least one entry stage of the equipment;

then forwarding the objects of value to a first processing area of the equipment, which area comprises one or several processing stages in which the objects of value are processed, in particular recognized and/or checked and/or counted and/or sorted;

then forwarding the objects of value to a second processing area of the equipment, which area has one or several output stages in which the objects of value are processed, in particular assembled and/or outputted from the equipment;

wherein that advance information about the objects of value received in the preparation stage is present in the system, in particular advance information concerning the packaging and/or the composition and/or the denomination and/or the origin and/or the quality and/or the condition and/or the authenticity of the objects of value received, and that the advance information is utilized by the system, in particular by a control of the system;

wherein that, in the case that, for the assembling of packs of objects of value to be delivered outbound, objects of value of a certain denomination are required, then, in order to optimize the processing of the objects of value, those objects of value inbound delivered to the system which have the denomination required for the assembling are processed by the system in a prioritized manner.

* * * * *